US012802409B2

(12) United States Patent
Ziai et al.

(10) Patent No.: US 12,802,409 B2
(45) Date of Patent: Nov. 17, 2026

(54) SYSTEMS AND METHODS FOR AUTOMATICALLY IDENTIFYING DIGITAL VIDEO CLIPS THAT RESPOND TO ABSTRACT SEARCH QUERIES

(71) Applicant: Netflix, Inc., Los Gatos, CA (US)

(72) Inventors: Amirreza Ziai, Menlo Park, CA (US); Aneesh Vartakavi, Emeryville, CA (US); Kelli Griggs, Running Springs, CA (US); Yvonne Sylvia Jukes, Los Angeles, CA (US); Sean Ferris, Sherman Oaks, CA (US); Eugene Lok, Los Angeles, CA (US); Alejandro Alonso, Los Angeles, CA (US)

(73) Assignee: Netflix, Inc., Los Gatos, CA (US)

( * ) Notice: Subject to any disclaimer, the term of this patent is extended or adjusted under 35 U.S.C. 154(b) by 720 days.

(21) Appl. No.: 18/186,467

(22) Filed: Mar. 20, 2023

(65) Prior Publication Data

US 2024/0320958 A1 Sep. 26, 2024

(51) Int. Cl.

| | |
|---|---|
| ***G06V 10/774*** | (2022.01) |
| ***G06F 16/735*** | (2019.01) |
| ***G06F 16/738*** | (2019.01) |
| ***G06F 16/75*** | (2019.01) |
| ***G06V 10/776*** | (2022.01) |
| ***G06V 10/94*** | (2022.01) |
| ***G06V 20/40*** | (2022.01) |

(52) U.S. Cl.

CPC .......... *G06V 10/774* (2022.01); *G06F 16/735* (2019.01); *G06F 16/738* (2019.01); *G06F 16/75* (2019.01); *G06V 10/776* (2022.01); *G06V 10/945* (2022.01); *G06V 20/41* (2022.01); *G06V 20/49* (2022.01)

(58) Field of Classification Search

CPC .. G06V 10/774; G06V 10/776; G06V 10/945; G06V 20/41; G06V 20/49; G06F 16/735; G06F 16/738; G06F 16/75

See application file for complete search history.

(56) References Cited

U.S. PATENT DOCUMENTS

2022/0261128 A1* 8/2022 Zadeh ............... G06F 16/24578

OTHER PUBLICATIONS

International Search Report for International Application No. PCT/US2024/020820, dated May 29, 2024; 3 pages.

Written Opinion for International Application No. PCT/US2024/020820, dated May 29, 2024; 9 pages.

* cited by examiner

*Primary Examiner* — Amandeep Saini
*Assistant Examiner* — Denise G Alfonso
(74) *Attorney, Agent, or Firm* — Keller Preece PLLC

(57) ABSTRACT

The disclosed computer-implemented methods and systems include implementations that automatically generate and train a video clip classifier model to identify video clips that respond to a specific search query for a desired depiction that can include abstract, context-dependent, and/or subjective terms. For example, the methods and systems described herein generate and update a digital content understanding graphical user interface to facilitate the process of generating a corpus of training digital video clips, training a video clip classifier model with the training digital video clips, and applying the video clip classifier model to new digital video clips. Various other methods, systems, and computer-readable media are also disclosed.

20 Claims, 17 Drawing Sheets

SYSTEMS AND METHODS FOR AUTOMATICALLY IDENTIFYING DIGITAL VIDEO CLIPS THAT RESPOND TO ABSTRACT SEARCH QUERIES

BACKGROUND

Digital media is increasingly consumed in many different forms. For example, users enjoy watching TV episodes and movies as well as trailers, previews, and clips from those TV episodes and movies. For example, a movie trailer typically includes shots from the movie that are collated in a way to pique a potential viewer's interest. Similarly, a preview for a season of TV episodes may include shots from the episodes within the season that foreshadow plot points and cliffhangers.

Generating trailers and previews, however, can give rise to various technological problems. For example, a movie trailer may be generated as the result of a process that involves a user manually searching through the shots of a movie for video clips that include a certain type of shot, a certain object, a certain character, a certain emotion, and so forth. In some cases, the user may utilize a search tool to help sort through the thousands of shots that movies and TV shows typically include. Despite this, existing search tools generally search through video clips attempting to match images in the clips to a text-based search query. This approach, however, is often incapable of handling nuanced search queries for anything other than specific objects or people included in a given shot.

As such, these existing search tools are often inaccurate. For example, existing search tools are often limited in terms of search modalities. To illustrate, a search tool may be able to match frames of a digital video (e.g., a movie) to a received search query for a concrete term-such as a search query for a particular object or character. As search queries become more nuanced, subjective, and context-dependent, standard search tools may lack the ability to return accurate results. Additional resources must then be spent in manually combing through these inaccurate results to find digital video clips that correctly respond to the search query.

Additionally, standard search tools for finding specific clips within a digital video are often inflexible. For example, as mentioned above, standard search tools are generally restricted to simple image-based searches and/or basic keyword searches. As such, these tools lack the flexibility to perform searches based on concepts that are more abstract such as searches for specifically portrayed emotions, shot types, and overall scene feeling.

Furthermore, existing search methodologies are generally inefficient. As discussed above, some search methods are completely manual and require users to extract digital video clips by hand. Other methodologies may include search tools that can identify digital video clips that respond to certain types of search queries, but these tools utilize excessive numbers of processor cycles and memory resources to perform searches that are limited to concrete search terms. In some cases, search methodologies may include machine-learning components, but these components are often manually built and trained—a process that requires extensive amounts of time and computing resources.

SUMMARY

As will be described in greater detail below, the present disclosure describes embodiments that automatically identify digital video clips that respond to abstract search queries for use in digital video assets such as trailers and previews. In one example, a computer-implemented method for automatically predicting classification categories for digital video clips that indicate whether the digital video clips respond to an abstract search query can include generating, by applying a video clip classifier model to a corpus of training digital video clips that respond to a received search input associated with a desired depiction and within a digital content understanding graphical user interface, classification category prediction displays for the corpus of training digital video clips, re-training the video clip classifier model based on user acknowledgements, detected via the digital content understanding graphical user interface, as to accuracies of classification scores generated by the video clip classifier model that correspond to the training digital video clips, parsing a digital video into digital video clips in response to detecting a selection of the digital video via the digital content understanding graphical user interface, and generating suggested digital video clip displays that replace the classification category prediction displays within the digital content understanding graphical user interface based on applying the re-trained video clip classifier model to the digital video clips.

Additionally, in some examples, the method can further include generating the corpus of training digital video clips by iteratively receiving the search input related to at least one of an object, an action, a shot type, an editing technique, a character, or a story theme, and identifying, within a repository of training digital video clips, a plurality of training digital video clips that respond to the received search input.

In some examples, the classification category prediction displays within the digital content understanding graphical user interface include a playback window loaded within a training digital video clip corresponding to the classification category prediction display. The classification category prediction displays can further include a title of a digital video from which the displayed training digital video clip came, and an option to positively acknowledge or negatively acknowledge the same training digital video clip. Generating the classification category prediction displays within the digital content understanding graphical user interface can further include sorting the classification category prediction displays into high levels of confidence and low levels of confidence and updating the classification category prediction displays within the digital content understanding graphical user interface according to the high levels of confidence and the low levels of confidence.

Furthermore, in some examples, the method can also include detecting the user acknowledgements as to the accuracies of the classification scores generated by the video clip classifier model by detecting at least one of (1) a first user input corresponding to a positive acknowledgement of a first video clip included in the training digital video clips, or (2) a second user input corresponding to a negative acknowledgement of the first video clip included in the training digital video clips. The method can also include detecting the selection of the digital video via the digital content understanding graphical user interface by detecting a selection of at least one of a short-form digital video, a long-form digital video, or a season of short-form digital videos. Additionally, parsing the digital video into digital video clips can include parsing the digital video into portions of continuous digital video footage between two cuts.

In some examples, generating the suggested digital video clip displays that replace the classification category prediction displays within the digital content understanding graphical user interface can include generating input vectors based on the digital video clips, applying the re-trained video clip classifier model to the generated input vectors, receiving, from the re-trained video clip classifier model, classification scores for the digital video clips that correspond to the received search input, generating, for the digital video clips, suggested video clip displays, and replacing the classification category prediction displays with the suggested digital video clip displays for the digital video clips within the digital content understanding graphical user interface according to the classification scores for the digital video clips.

Some examples described herein include a system with at least one physical processor and physical memory including computer-executable instructions that, when executed by the at least one physical processor, cause the at least one physical process to perform various acts. In at least one example, the computer-executable instructions, when executed by the at least one physical processor, cause the at least one physical processor to perform acts including generating, by applying a video clip classifier model to a corpus of training digital video clips that respond to a received search input associated with a desired depiction and within a digital content understanding graphical user interface, classification category prediction displays for the corpus of training digital video clips, re-training the video clip classifier model based on user acknowledgements, detected via the digital content understanding graphical user interface, as to accuracies of classification scores generated by the video clip classifier model that correspond to the training digital video clips, parsing a digital video into digital video clips in response to detecting a selection of the digital video via the digital content understanding graphical user interface, and generating suggested digital video clip displays that replace the classification category prediction displays within the digital content understanding graphical user interface based on applying the re-trained video clip classifier model to the digital video clips.

In some examples, the above-described method is encoded as computer-readable instructions on a computer-readable medium. In one example, the computer-readable instructions, when executed by at least one processor of a computing device, cause the computing device to generate, by applying a video clip classifier model to a corpus of training digital video clips that respond to a received search input associated with a desired depiction and within a digital content understanding graphical user interface, classification category prediction displays for the corpus of training digital video clips, re-train the video clip classifier model based on user acknowledgements, detected via the digital content understanding graphical user interface, as to accuracies of classification scores generated by the video clip classifier model that correspond to the training digital video clips, parse a digital video into digital video clips in response to detecting a selection of the digital video via the digital content understanding graphical user interface, and generate suggested digital video clip displays that replace the classification category prediction displays within the digital content understanding graphical user interface based on applying the re-trained video clip classifier model to the digital video clips.

In one or more examples, features from any of the embodiments described herein are used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
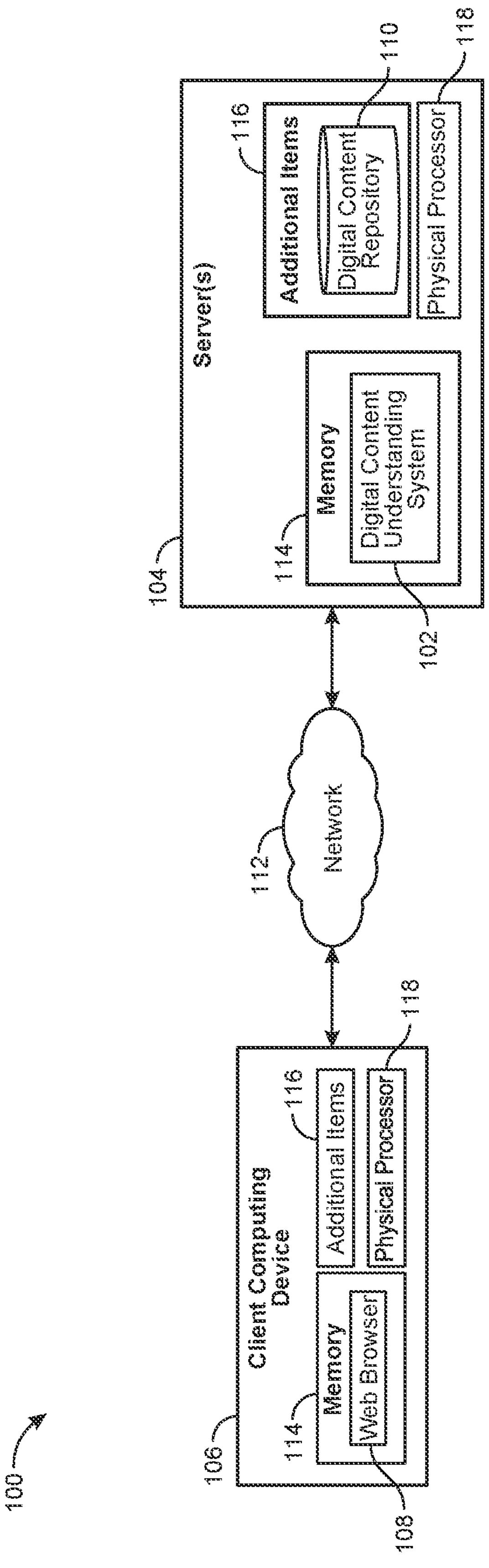
FIG. 1 is a block diagram of an exemplary environment for implementing a digital content understanding system in accordance with one or more implementations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

As mentioned above, quickly generating digital media assets such as trailers and previews is often desirable. For example, content creators often need to be able to quickly identify video clips from a movie that respond to specific search queries in order to efficiently construct a trailer for the movie that conveys the desired story, emotion, tone, etc. Existing methods for querying video clips from digital videos generally include search tools that lack the capability to handle nuanced or abstract search queries. In some cases, a search tool may incorporate machine learning components. These components, however, are often individually constructed and trained in processes that are slow, inefficient, and computationally expensive.

To remedy these problems, the present disclosure describes implementations that can automatically generate and train a video clip classifier model to identify video clips that respond to a specific search query that can include abstract, context-dependent, and/or subjective terms. For example, the implementations described herein can generate a digital content understanding graphical user interface that guides the process of generating training data, building a video clip classifier model, training the video clip classifier model, and applying the video clip classifier model to new video clips. The implementations described herein can identify training digital video clips that respond both positively and negatively to a received search query and can generate classification category predictions for each of the identified training digital video clips. The implementations described herein can further receive, via the digital content understanding graphical user interface, acknowledgements as to the accuracy of these predictions. The implementations described herein can further train the video clip classifier model based on the acknowledgements received via the digital content understanding graphical user interface. Ultimately, the implementations described herein can further apply the trained video clip classifier model to new video clips parsed from a movie or TV episode to determine which video clips respond to the term, notion, or moment for which the video clip classifier was trained.

In more detail, the disclosed systems and methods offer an efficient methodology for generating a corpus of training digital video clips for training a video clip classifier model. For example, the disclosed systems and methods enable a user to search for training digital video clips that respond to search queries associated with a depiction of a particular moment. To illustrate, if the particular moment is "thoughtful clips," the disclosed systems and methods can enable the user to search for training digital video clips that respond to search queries that positively inform that particular moment such as "quiet," "seated," "slow walking," "soft music," and "close-up face." The disclosed systems and methods can further enable the user to search for training digital video clips that respond to search queries that negatively inform that particular moment such as "loud," "action," "explosions," and "group shots." By using all these training digital video clips, the disclosed systems and methods enable the creation of a video clip classifier model that is precisely trained to a specific definition of a particular moment. By further enabling the quick labeling of low confidence classification predictions generated by the video clip classifier model during training, the disclosed systems and methods efficiently enable further improvement of the video clip classifier model.

Once trained, the disclosed systems and methods can apply the video clip classifier model to additional digital video clips. For example, the disclosed systems and methods can apply the video clip classifier model to user-indicated digital video (e.g., a TV episode, a season of TV episodes) to generate classification predictions for video clips from the user-indicated digital video. Because of how the disclosed systems and methods generate the training corpus for the video clip classifier model, the predictions generated by the video clip classifier model are precisely tailored to how the user defined the particular moment in which they are interested.

Features from any of the implementations described herein may be used in combination with one another in accordance with the general principles described herein. These and other implementations, features, and advantages will be more fully understood upon reading the following detailed description in conjunction with the accompanying drawings and claims.

Figure 2:
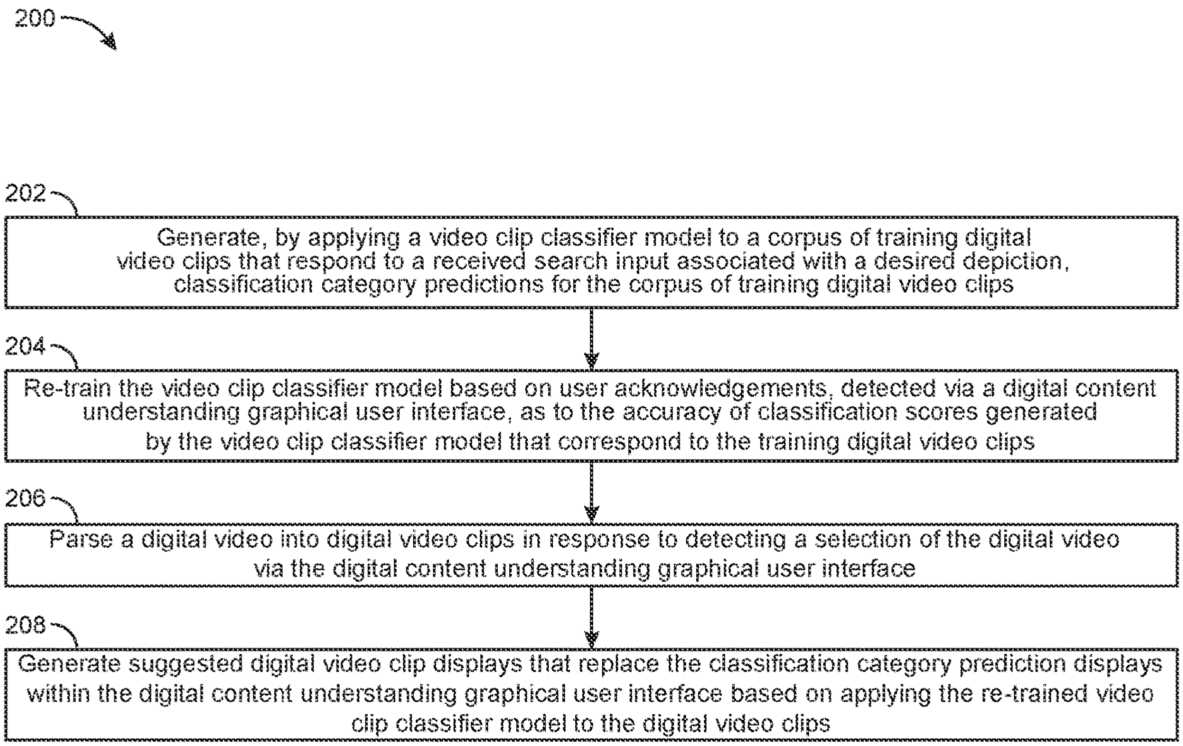
FIG. 2 is a flow diagram of an exemplary computer-implemented method for automatically generating classification category predictions indicating digital video clips that respond to specific and abstract search queries in accordance with one or more implementations.
Figure 3A:
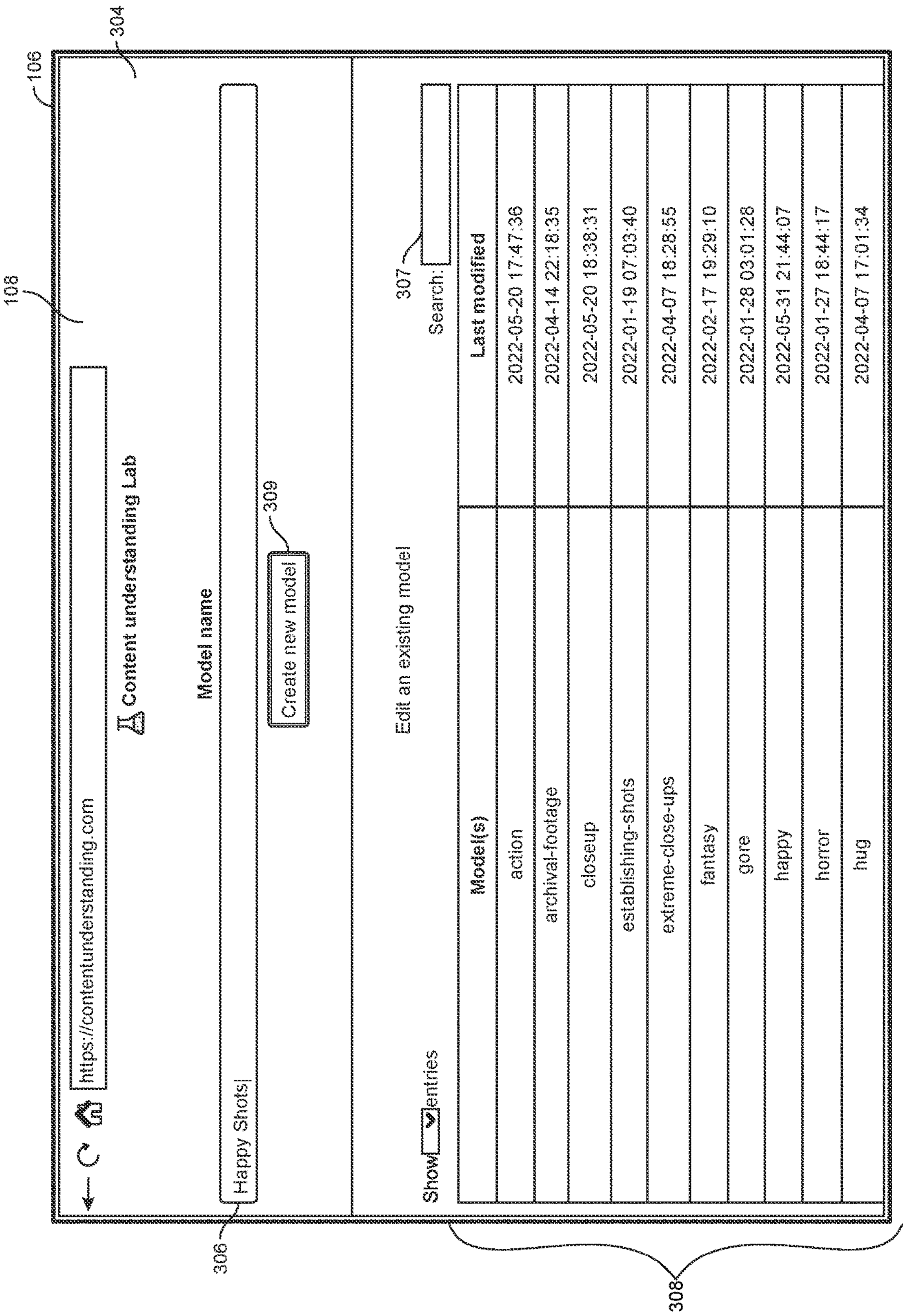
FIGS. 3A-3N illustrate a digital content understanding graphical user interface during the process of generating and utilizing a video clip classifier model for identifying specific digital video clips in accordance with one or more implementations.
Figure 3B:
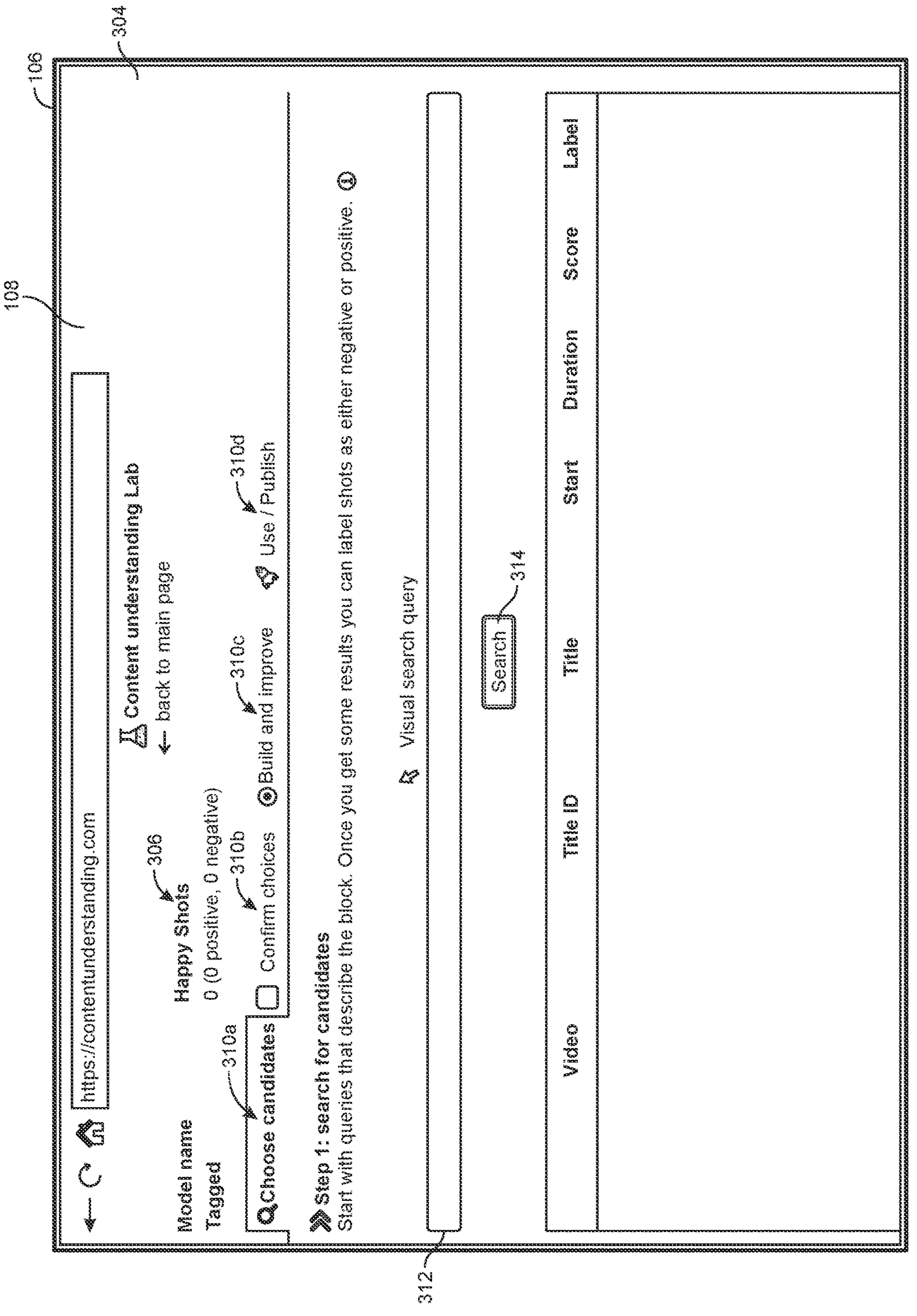
Figure 3C:
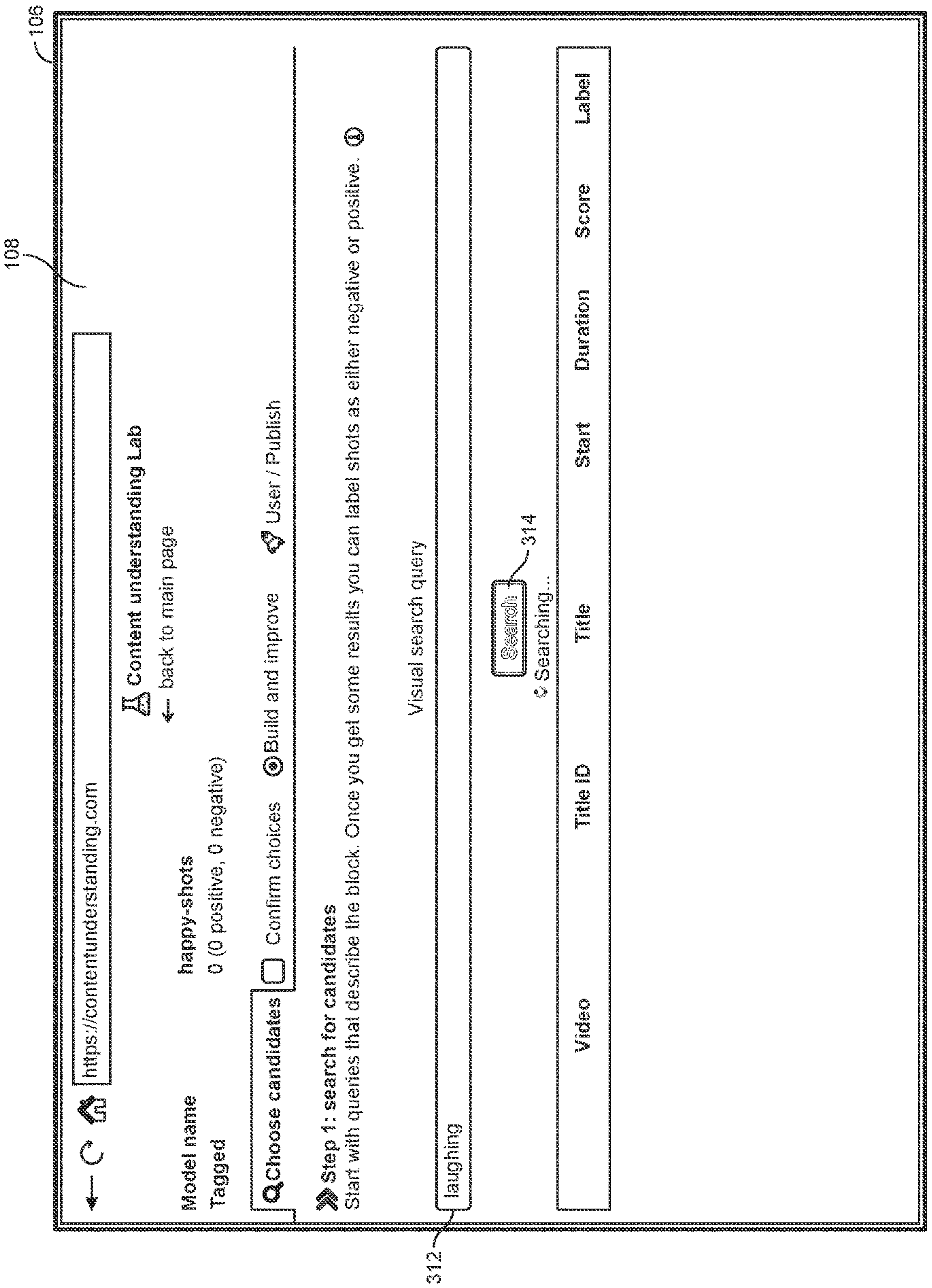
Figure 3D:
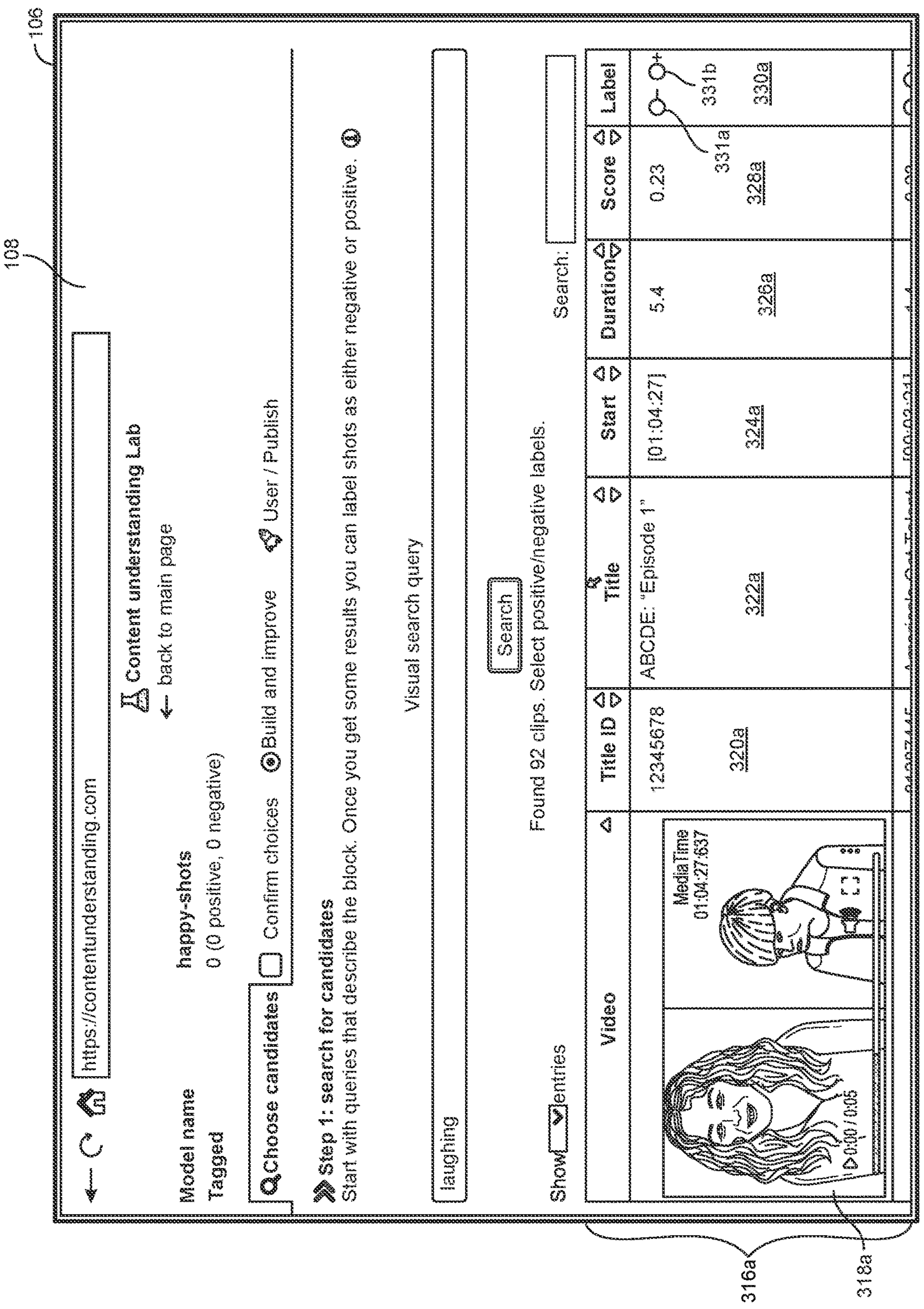
Figure 3E:
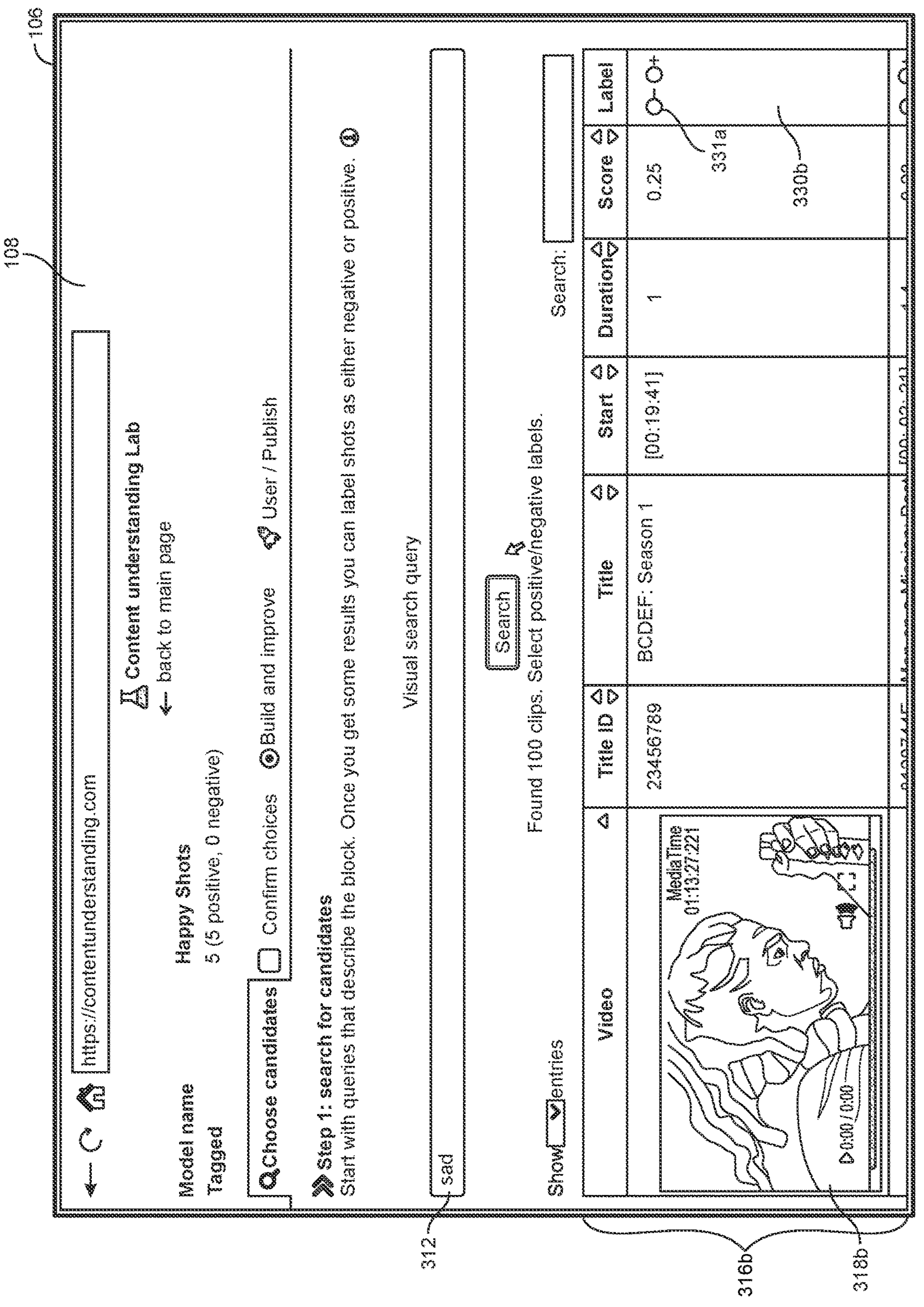
Figure 3F:
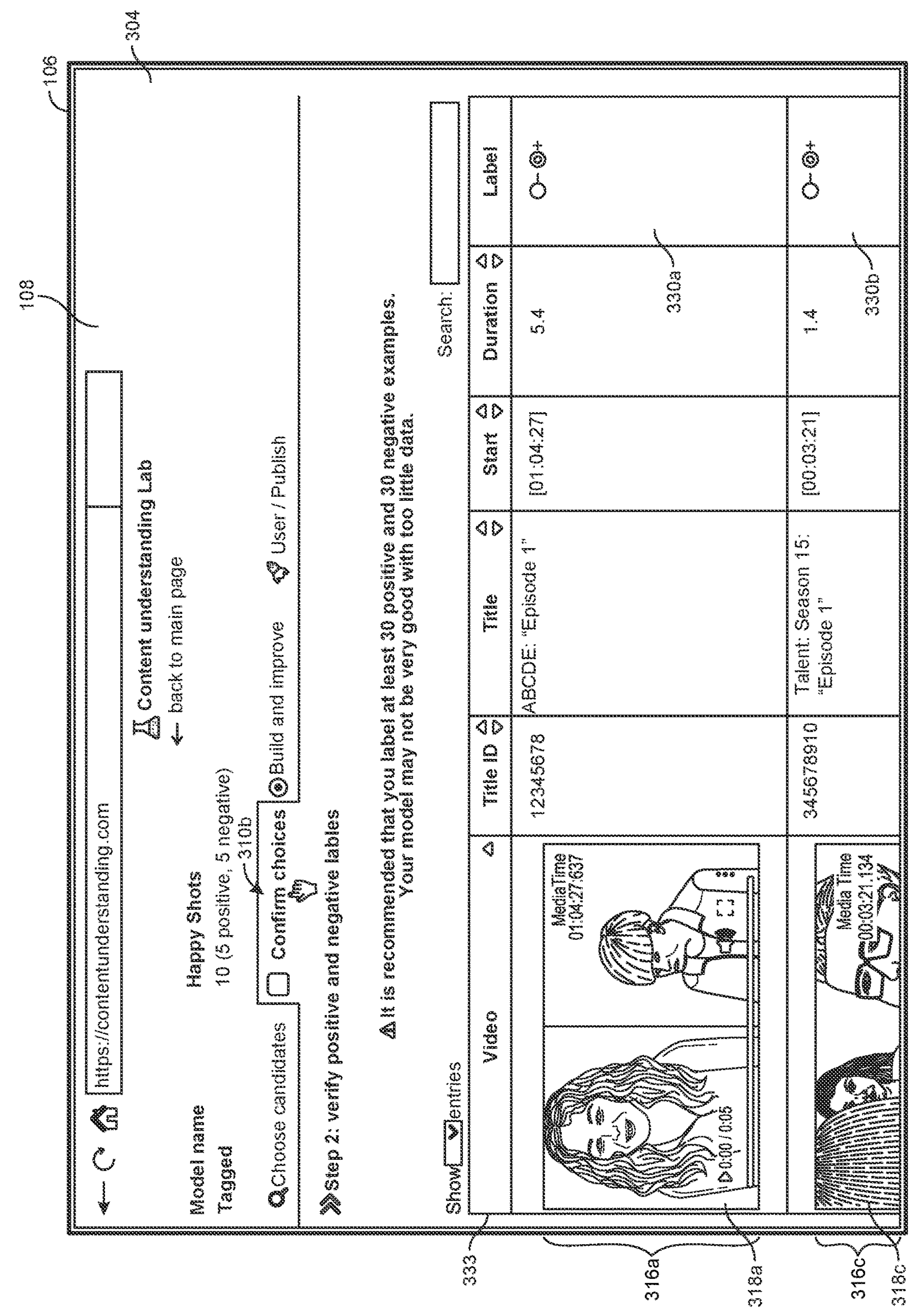
Figure 3G:
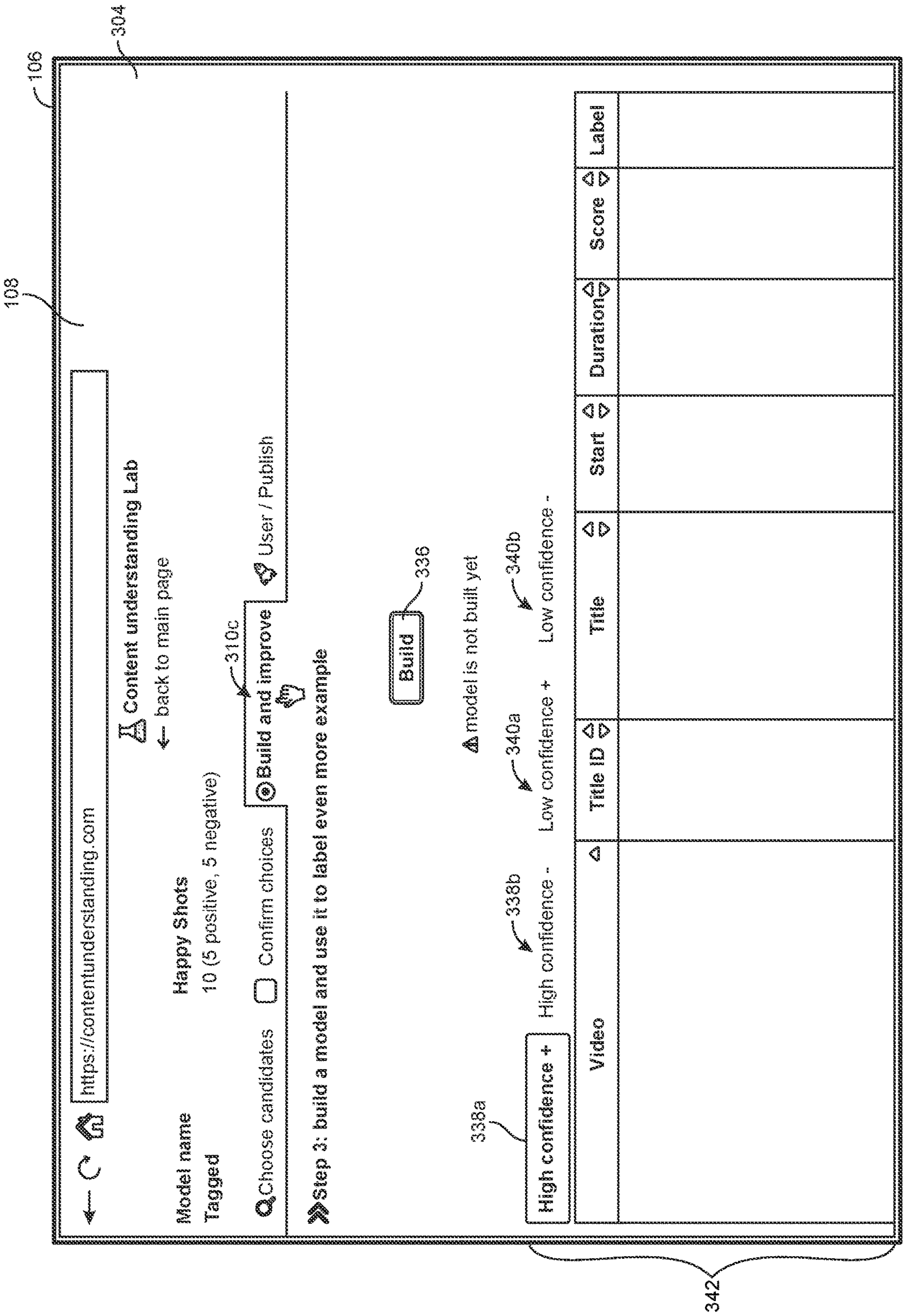
Figure 3H:
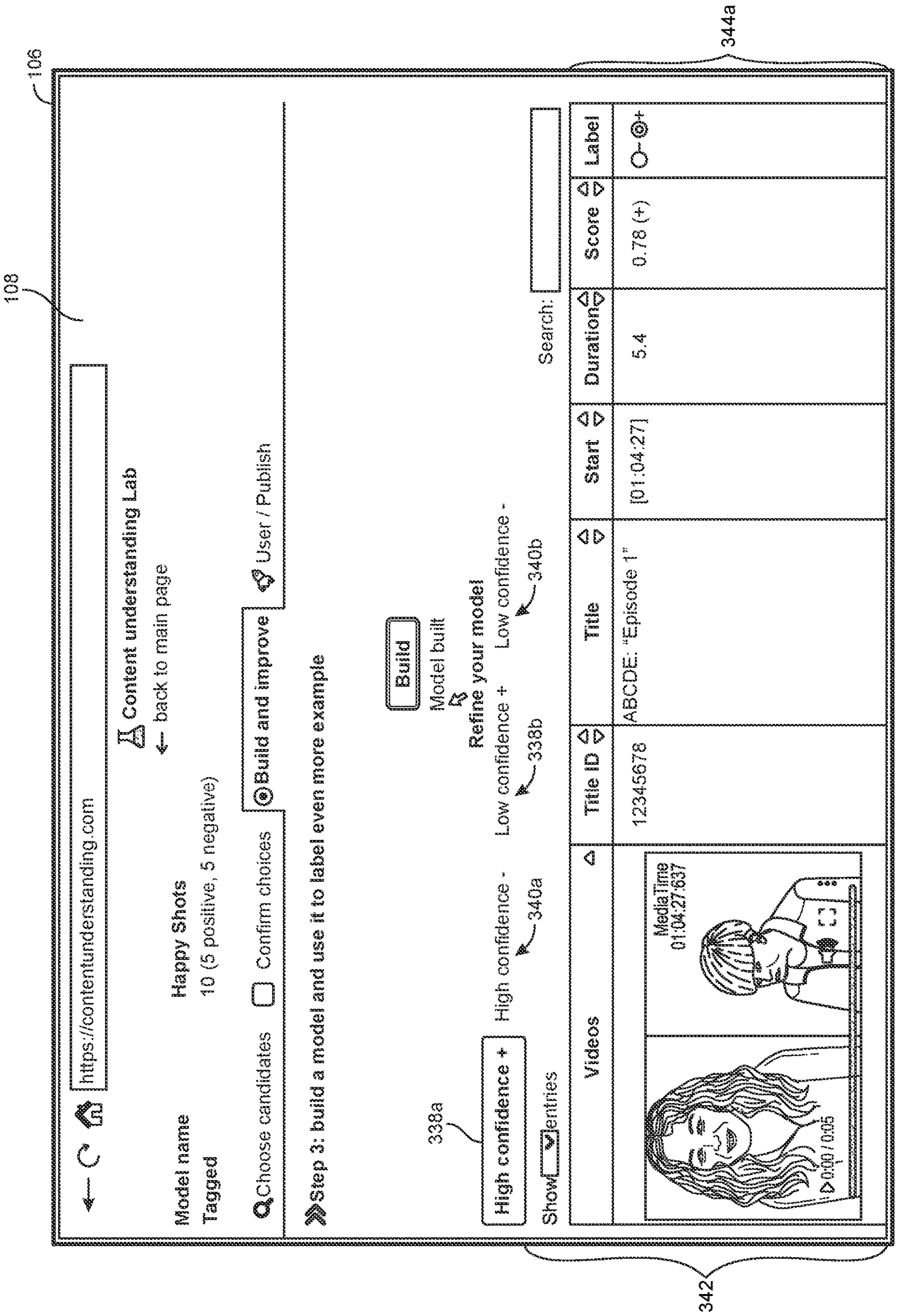
Figure 3I:
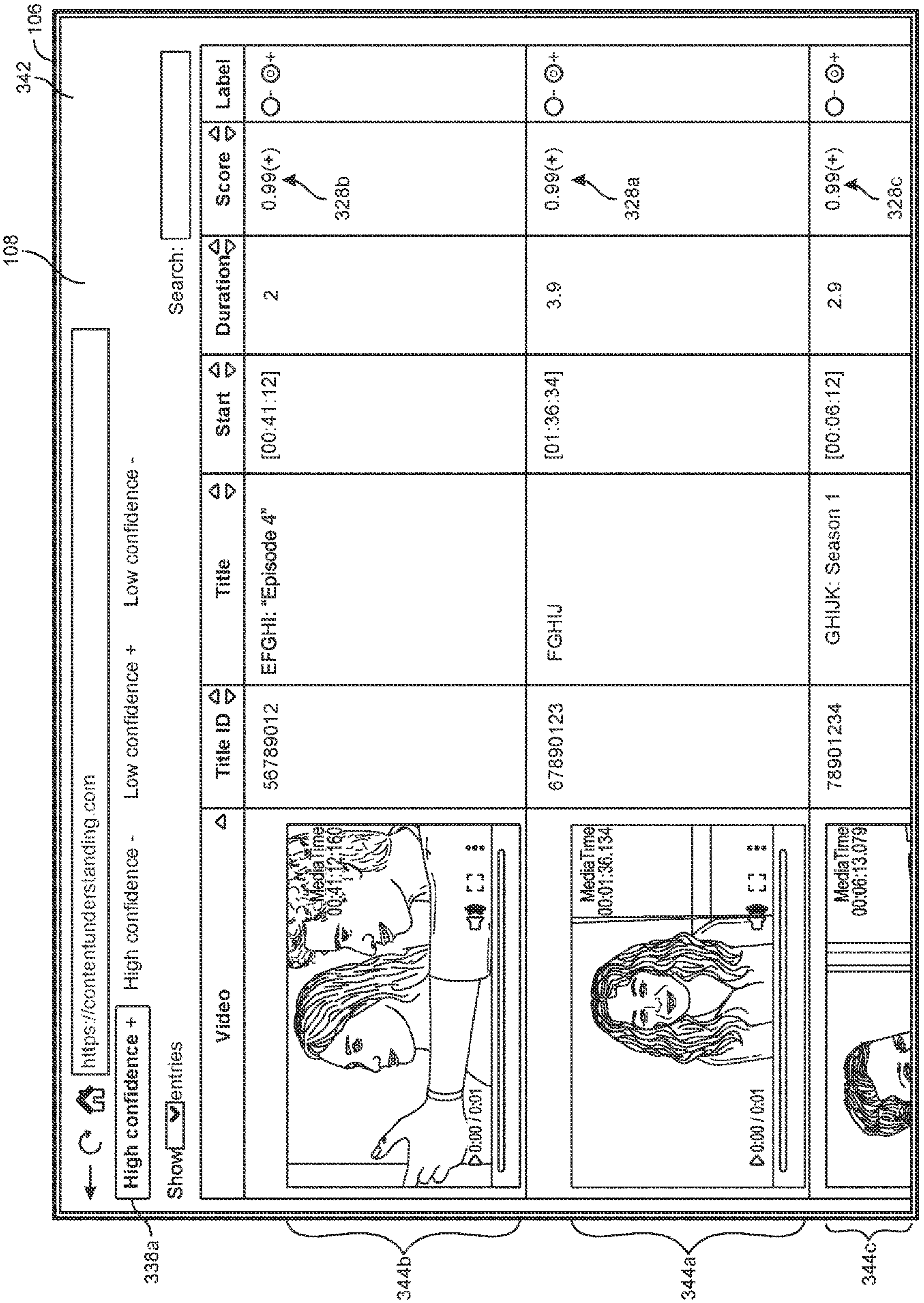
Figure 3J:
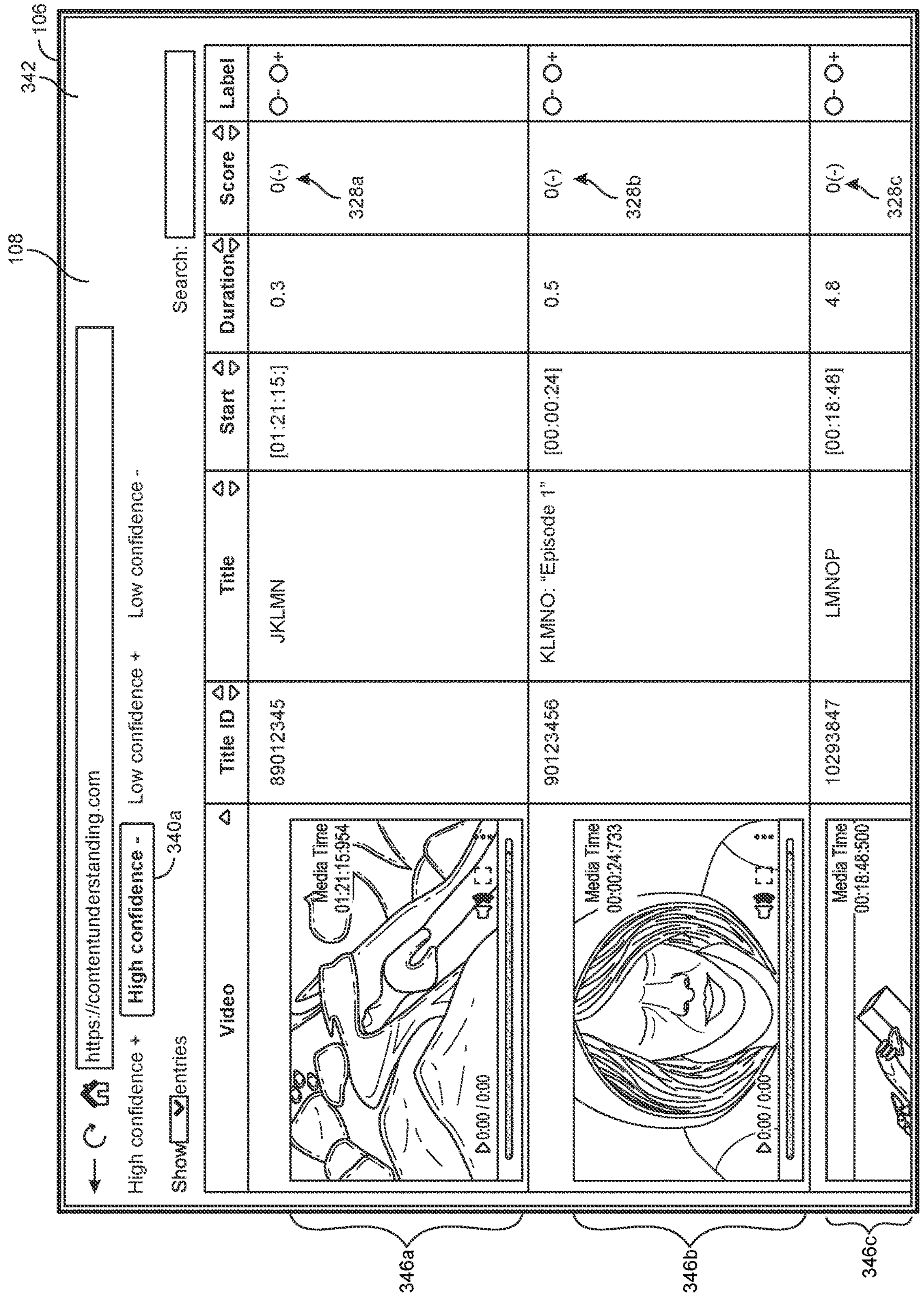
Figure 3K:
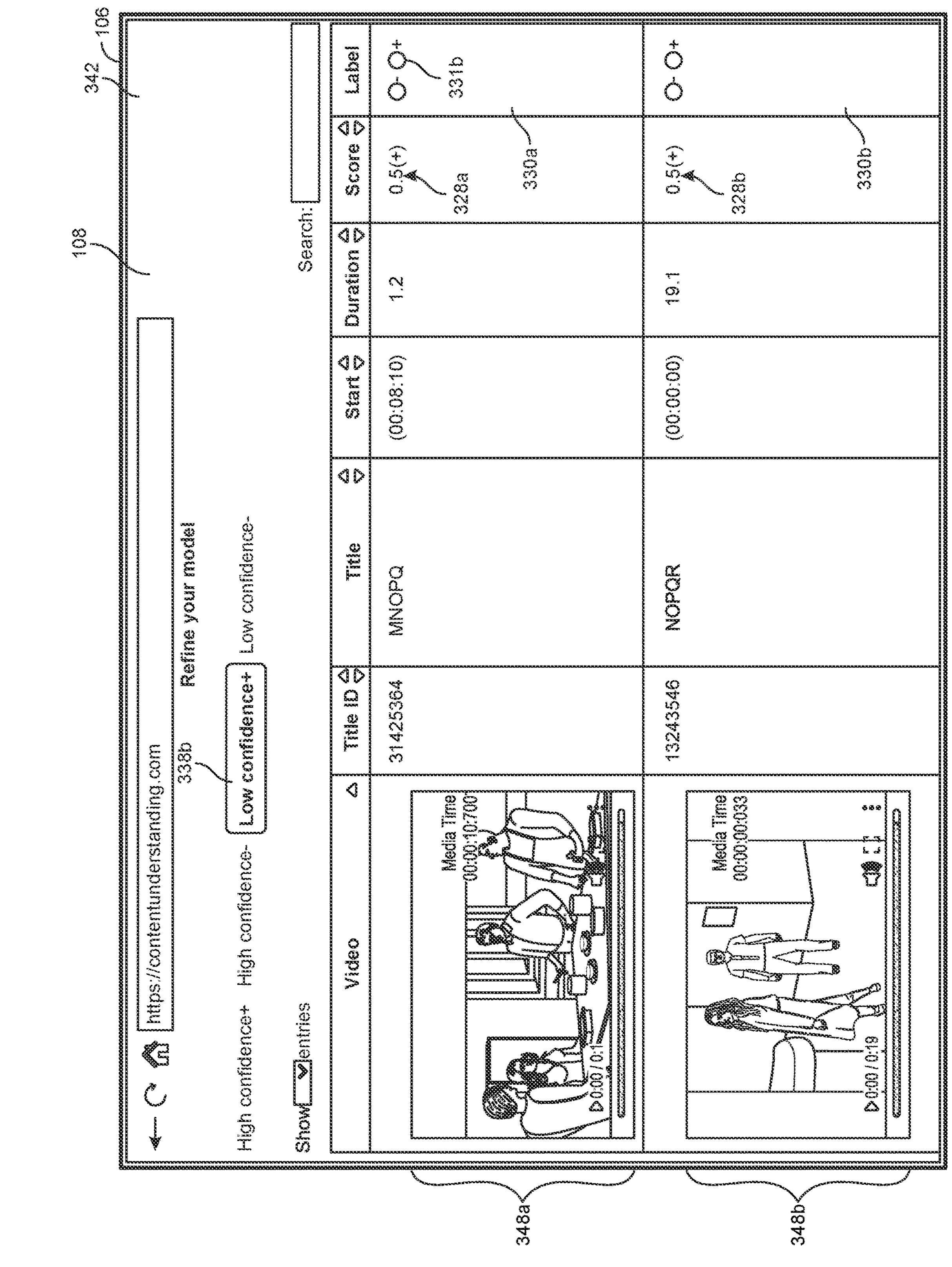
Figure 3L:
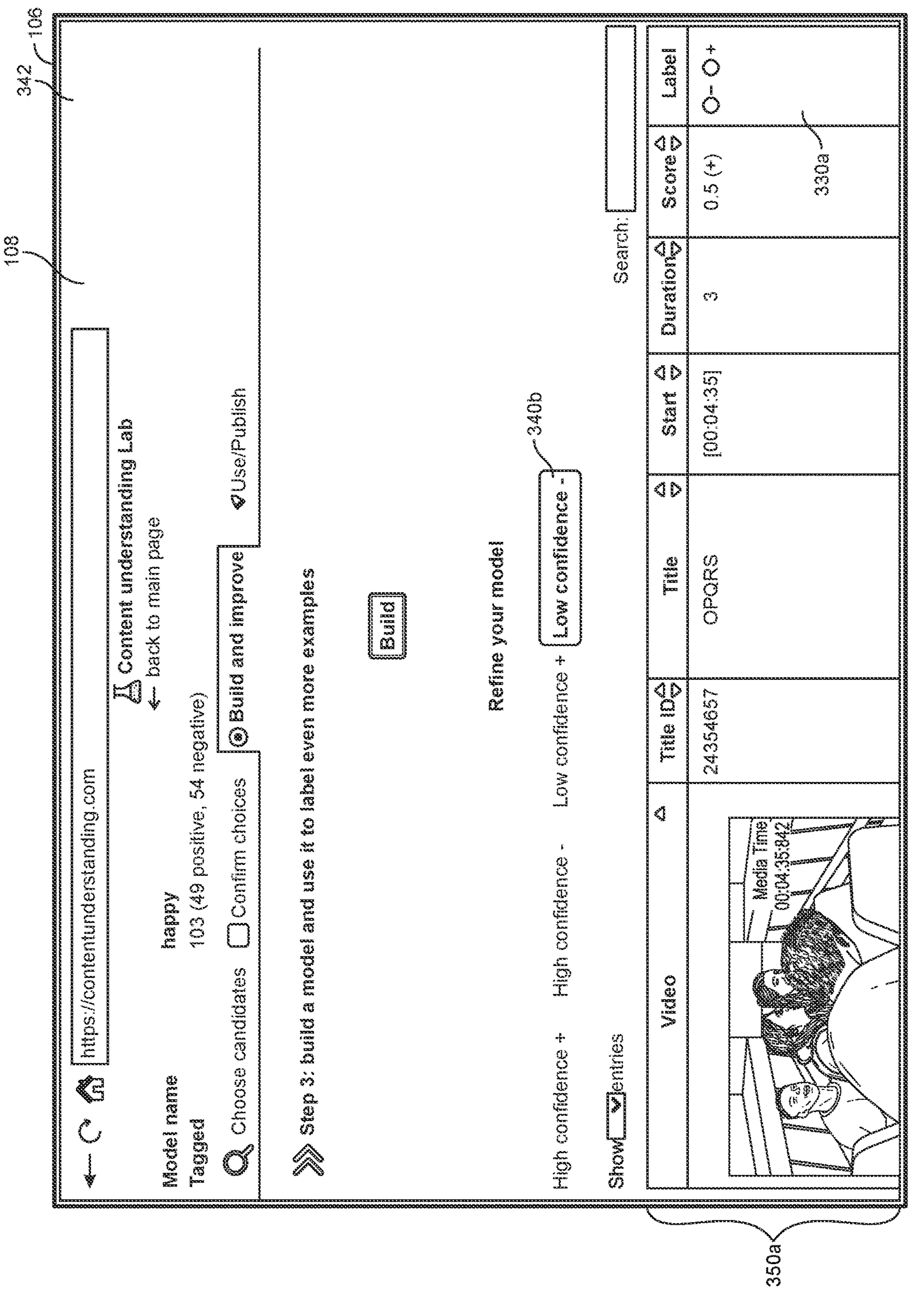
Figure 3M:
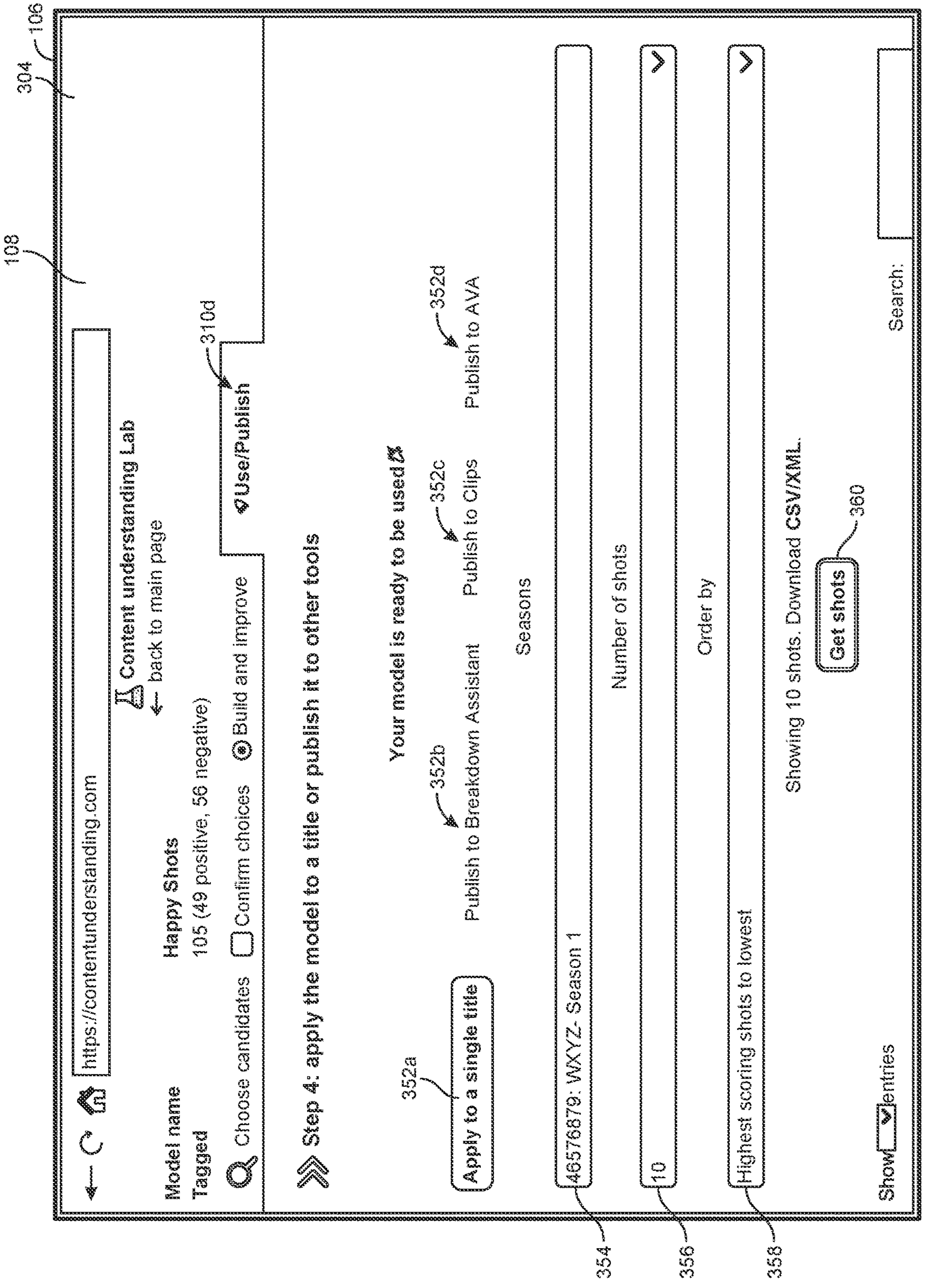
Figure 3N:
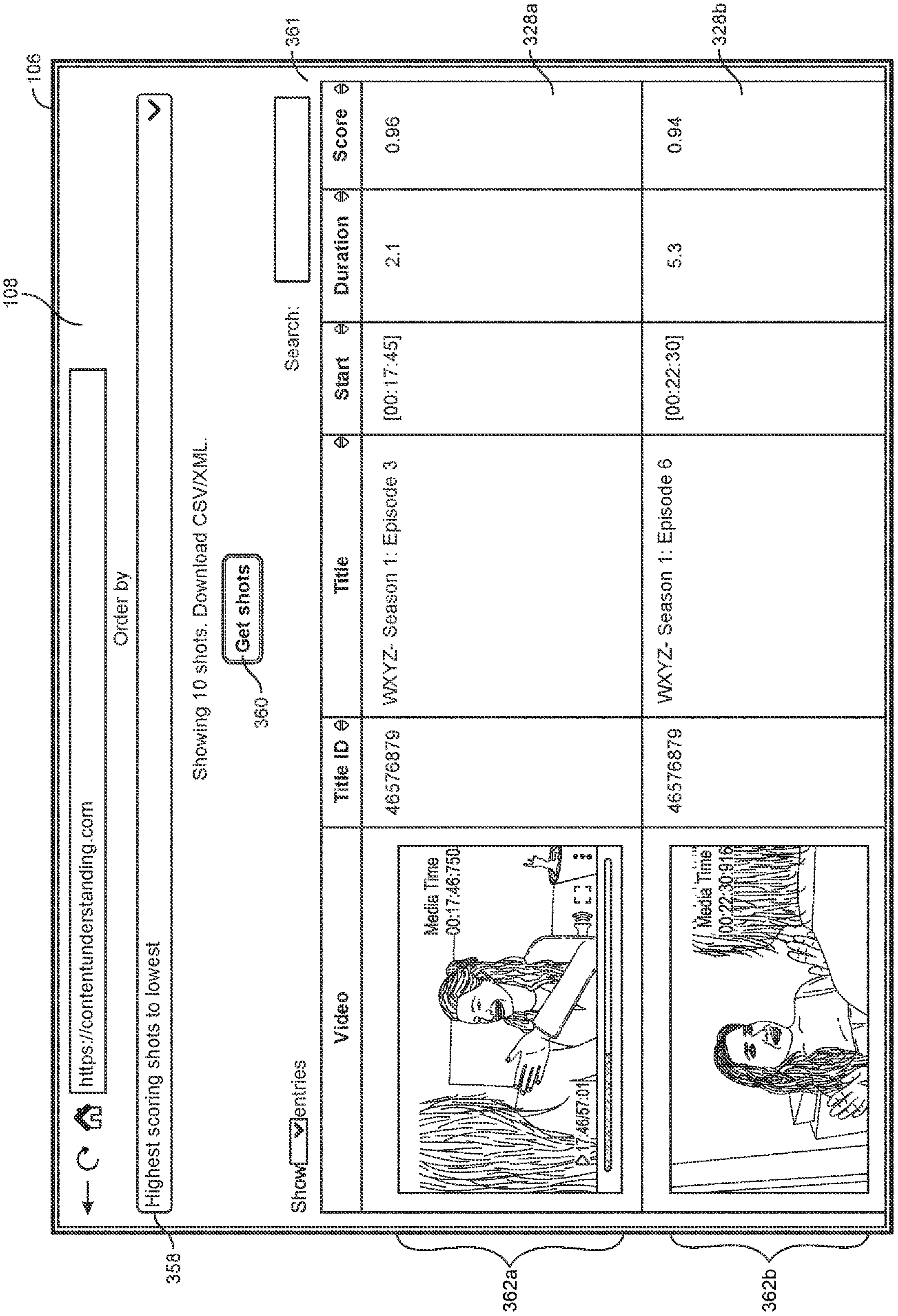
Figure 4:
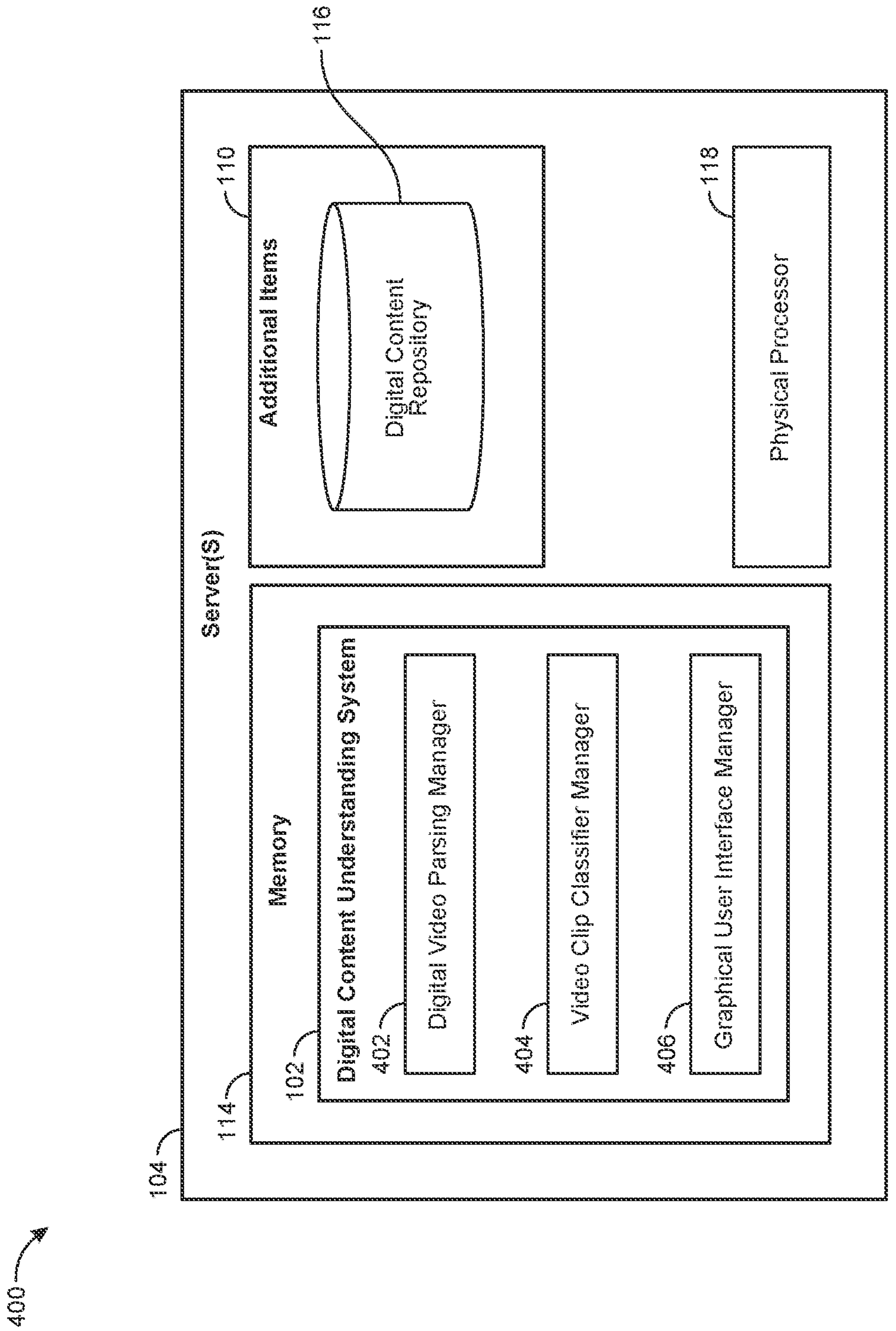
FIG. 4 is a detailed diagram of the digital content understanding system in accordance with one or more implementations.

The following will provide, with reference to FIGS. 1-4, detailed descriptions of a digital content understanding system that can quickly and efficiently generate trained video clip classifier models that identify video clips responding to specific search queries. For example, an exemplary network environment is illustrated in FIG. 1 to show the digital content understanding system operating in connection with various devices while generating and training video clip classifier models. FIG. 2 illustrates steps taken by the digital content understanding system during this process. FIGS. 3A-3N illustrates a digital content understanding graphical user interface generated by the digital content understanding system as it guides the process of generating, training, and applying a video clip classifier model. Finally, FIG. 4 provides additional detail with regard to the features and functionality of the digital content understanding system.

As just mentioned, FIG. 1 illustrates an exemplary networking environment 100 implementing aspects of the present disclosure. For example, the networking environment 100 can include server(s) 104, a client computing device 106, and a network 112. As further shown, the server(s) 104 and client computing device 106 can include a memory 114, additional items 116, and a physical processor 118.

In at least one implementation, a digital content understanding system 102 may be implemented within the memory 114 of the server(s) 104. In some implementations, the client computing device 106 may also include a web browser 108 installed on the memory 114 thereon. As shown in FIG. 1, the client computing device 106 and the server(s) 104 can communicate via the network 112 to transmit and receive digital content data.

In one or more implementations, the client computing device 106 can include any type of computing device. For example, the client computing device 106 can include a desktop computer, a laptop computer, a tablet computer, a smart phone, a smart wearable, an augmented reality device, and/or a virtual reality device. In at least one implementation, the web browser 108 installed thereon can access websites, download content, render web page displays, and so forth.

As further shown in FIG. 1, the networking environment 100 can include the digital content understanding system 102. In one or more implementations, the digital content understanding system 102 can generate and provides a digital content understanding graphical user interface to the client computing device 106. In one or more implementations, the digital content understanding system 102 can generate and train video clip classifier models in response to different types of interactions detected via the digital content understanding graphical user interface. Ultimately, the digital content understanding system 102 can automatically identify video clips from a digital video (e.g., a movie or TV episode) that depict a specified object, person, moment, shot type, etc.

In at least one implementation, the digital content understanding system 102 can utilize a digital content repository 110 stored within the additional items 116 on the server(s) 104. For example, the digital content repository 110 can store and maintain training digital video clips. The digital content repository 110 can further store and maintain digital videos such as digital movies and TV episodes. The digital content repository 110 can maintain training digital video clips, digital videos, and other digital content (e.g., digital audio files, digital text such as film scripts, digital photographs) in any of various organizational schemes such as, but not limited to, alphabetically, by runtime, by genre, by type, etc.

As mentioned above, the client computing device 106 and the server(s) 104 may be communicatively coupled through the network 112. The network 112 may represent any type or form of communication network, such as the Internet, and may include one or more physical connections, such as a LAN, and/or wireless connections, such as a WAN.

Although FIG. 1 illustrates components of the networking environment 100 in one arrangement, other arrangements are possible. For example, in one implementation, the digital content understanding system 102 can operate as a native application that may be installed on the client computing device 106. In another implementation, the digital content understanding system 102 may operate across multiple servers. Moreover, in some implementations, the digital content understanding system 102 may operate from within a larger digital content system that streams digital content to client streaming devices.

In one or more implementations, the methods and steps performed by the digital content understanding system 102 reference multiple terms. For example, the term "digital video" can refer to a digital media item. In one or more implementations, a digital video includes both audio and visual data such as image frames synchronized to an audio soundtrack. As used herein, the term "digital video clip" can refer to a portion of a digital video. For example, a digital video clip can include image frames and synchronized audio for footage that occurs between cuts or transitions within the video. In one or more implementations, a "short-form digital video" can refer to an episodic digital video such as an episode of a television show. It follows that a "season of short-form digital videos" can refer to a collection of episodic digital videos. For example, a season of episodic digital videos can include any number of short-form digital videos (e.g., 10 episodes-22 episodes). Additionally, as used herein, a "long-form digital video" can refer to a non-episodic digital video such as a movie.

As used herein, a "search query" can refer to a word, phrase, image, or sound that correlates with one or more repository entries. For example, a search query can include a title or identifier of a digital video stored in the repository 110. Additionally, as used herein, a "desired depiction" can refer to a particular type of search query that a video clip classifier model can be trained against. For example, a desired depiction can include an object, character, actor, filming technique, feeling, action, etc. that a video clip classifier model can be trained to identify within a video clip. In the examples described herein, a desired depiction may correlate with the name or title of a video clip classifier.

As used herein, the term "video clip classifier model" can refer to a computational model that may be trained to generate predictions. For example, as described in connection with the examples herein, a video clip classifier model may be a binary classification machine learning model that can be trained to generate predictions indicating whether a video clip shows a particular desired depiction. In at least one implementation, the video clip classifier model may generate such a prediction in the form of a classification score (e.g., between zero and one) that indicates a level of confidence as to whether a video clip shows a particular desired depiction. As such, a video clip classifier model may indicate a high level of confidence that a video clip includes a desired depiction by generating a classification score that is close to one (e.g., 0.90). Conversely, a video clip classifier model may indicate a low level of confidence that a video clip includes a desired depiction by generating a classification score that is close to zero (e.g., 0.1).

As used herein, a "corpus of training digital video clips" can refer to a collection of digital video clips that are used to train a video clip classifier model. For example, training digital video clips can include video clips that positively correspond with a search query or desired depiction (i.e., video clips that include the desired depiction). Training digital video clips can also include video clips that negatively correspond with the search query or desired depiction (i.e., video clips that do not include the desired depiction). By training the video clip classifier model with such video clips, the video clip classifier model can learn to determine whether or not a video clip includes a desired depiction.

As used herein, "user acknowledgements" can refer to user input associated with training digital video clips and/or classification category predictions. For example, the digital content understanding system 102 can generate a digital content understanding graphical user interface that includes selectable acknowledgement options. Using these options, the digital content understanding system 102 can detect user selections that positively acknowledge a training digital video clip indicating that a training digital video clip should be included as a positive training example for a video clip classifier model. The digital content understanding system 102 can also detect, via these options, a positive acknowledgement of a classification category prediction indicating that the classification category prediction correctly includes a desired depiction. Additionally, the digital content understanding system 102 can detect user selections that negatively acknowledge a training digital video clip indicating that the training digital video clips should be included as a negative training example for the video clip classifier model. The digital content understanding system 102 can also detect a negative acknowledgement of a classification category prediction indicating that the classification category prediction incorrectly fails to include the desired depiction.

As used herein, the term "classification category prediction" can refer to a training digital video clip and its corresponding classification score. The digital content understanding system 102 can generate the digital content understanding graphical user interface including a classification category prediction display that includes several pieces of relevant information for a training digital video clip. For example, the classification category prediction display can include the training digital video clip loaded into a playback control, a title of the digital video from which the training digital video clip came, the classification score for the training digital video clip, options to positively acknowledge or negatively acknowledge the classification score for the classification category prediction, and other information.

Similarly, as used herein, the term "suggested digital video clip" can refer to a digital clip that is not part of the training corpus but is determined by a trained video clip classifier model to include the desired depiction for which the video clip classifier model was trained. For example, the digital content understanding system 102 can generate suggested digital video clip displays that include information similar to that included in classification category prediction displays. In at least one implementation, the digital content understanding system 102 can generate suggested digital video clip displays without options to positively acknowledge or negatively acknowledge classification scores as the digital content understanding system 102 generally provides suggested digital video clip displays following training of the associated video clip classifier model.

As mentioned above, FIG. 2 is a flow diagram of an exemplary computer-implemented method 200 for automatically generating classification category predictions indicating digital video clips that respond to specific and potentially abstract search queries. The steps shown in FIG. 2 may be performed by any suitable computer-executable code and/or computing system, including the system(s) illustrated in FIG. 4. In one example, each of the steps shown in FIG. 2 may represent an algorithm whose structure includes and/or is represented by multiple sub-steps, examples of which will be provided in greater detail below.

As illustrated in FIG. 2, at step 202 the digital content understanding system 102 can generate, by applying a video clip classifier model to a corpus of training digital video clips that respond to a received search input, classification category predictions for the corpus of training digital video clips. For example, the digital content understanding system 102 can generate the corpus of training digital video clips that includes digital video clips that positively respond to a search query (e.g., a desired video clip depiction) and digital video clips that negatively respond to a search query. The digital content understanding system 102 can further receive user acknowledgements as to the accuracy of the training digital video clips that correspond to the search query. The digital content understanding system 102 can further apply a video clip classifier model to the corpus of training digital video clips to generate classification category predictions for each of the training digital video clips, where the classification category prediction for a training digital video clip indicates a likelihood that the training digital video clip portrays the desired depiction (e.g., a person, place, object, feeling, filming technique).

Additionally, at step 204 the digital content understanding system 102 can re-train the video clip classifier model based on user acknowledgements, detected via a digital content understanding graphical user interface, as to the accuracy of classification scores generated by the video clip classifier model that correspond to the training digital video clips. For example, in order to further train the video clip classifier model to accurately generate classification category predictions relative to the desired depiction, the digital content understanding system 102 can generate a display including the classification category predictions. The digital content understanding system 102 can generate the display such that each classification category prediction includes an indication of its associated digital video clip as well as an option for a user to indicate whether the classification score associated with the classification category prediction is accurate. In response to detecting user acknowledgements as to the accuracy of a threshold number of classification category predictions, the digital content understanding system 102 can re-train the video clip classifier model based on the acknowledgements.

Furthermore, at step 206 the digital content understanding system 102 can parse a digital video into digital video clips in response to detecting a selection of the digital video via the digital content understanding graphical user interface. For example, in response to re-training the video clip classifier model, the digital content understanding system 102 can apply the video clip classifier model to video clips that are not part of the corpus of training digital video clips. As such, the digital content understanding system 102 can detect a user selection of a digital video (e.g., a movie, a TV episode, a season of TV episodes), and then parse the selected digital video into digital video clips. In at least one implementation, the digital content understanding system 102 parses a digital video clip to include the film footage between two cuts or film transitions.

Moreover, at step 208, the digital content understanding system 102 can generate suggested digital video clip displays that replace the classification category prediction displays within the digital content understanding graphical user interface based on applying the re-trained video clip classifier model to the digital video clips. For example, the digital content understanding system 102 can apply the re-trained video clip classifier model to the digital video clips parsed from the selected digital video to generate suggested digital video clip displays with classification scores that indicate whether or not the associated digital video clips respond to the received search query by portraying a desired depiction. As such, the combination of automatic and user-guided steps in the process for generating suggested digital video clips displays can result in highly accurate suggested digital video clips-even when the related search query is abstract, subjective, and/or context-dependent.

As discussed above, the digital content understanding system 102 generates and provides a digital content understanding graphical user interface to the client computing device 106 to guide the process of generating and utilizing a video clip classifier model for identifying specific digital video clips. FIGS. 3A-3N illustrate the digital content understanding graphical user interface generated and updated by the digital content understanding system 102 during this process. For example, as shown in FIG. 3A shows a digital content understanding graphical user interface 304 displayed via the web browser 108 on the client computing device 106.

In one or more implementations, the digital content understanding system 102 can generate the digital content understanding graphical user interface 304 including various options associated with video clip classifier models. For example, the digital content understanding system 102 can generate the digital content understanding graphical user interface 304 including a list 308 of existing video clip classifier models. In response to a detected selection of any of the existing video clip classifier models in the list 308, the digital content understanding system 102 can make the selected video clip classifier model available for additional training and/or application to video clips parsed from a digital video (e.g., a movie or TV episode). To illustrate, in response to a detected selection of the "closeup" video clip classifier model in the list 308, the digital content understanding system 102 can make that model available for application to digital video clips parsed from a digital video. The "closeup" video clip classifier model can then generate classification category predictions for each of the digital video clips, where the classification category predictions indicate whether each of the digital video clips depict a closeup shot of people, objects, scenes, etc.

In addition to providing access to existing video clip classifier models, the digital content understanding system 102 can further generate the digital content understanding graphical user interface 304 including options for generating a new video clip classifier model. For example, in response to a user input of a new video clip classifier model title (e.g., "Happy Shots") in the text input box 306 and a detected selection of the "Create New Model" button 309, the digital content understanding system 102 can initiate the process of generating a new video clip classifier model. In one or more implementations, the text entered into the text input box 306 can indicate a search query or desired depiction that will be the focus of the new video clip classifier model.

Additionally, as shown in FIG. 3A, the digital content understanding system 102 can further generate the digital content understanding graphical user interface 304 including a model search text box 307. In one or more implementations, the digital content understanding system 102 can search the digital content repository 110 for one or more video clip classifier models that respond to a search query received via the model search text box 307. In at least one implementation, the digital content understanding system 102 can search for models with names similar or related to the search query received via the model search text box 307. In additional implementations, the digital content understanding system 102 can search for models that have been previously applied to TV episodes and/or movies indicated via the model search text box 307. Moreover, the digital content understanding system 102 can search for models that are associated with a desired depiction of a particular moment indicated via the model search text box 307. In this way, the digital content understanding system 102 can provide quick access to previously trained and utilized video clip classifier models that may have been configured by other users.

As shown in FIG. 3B, the digital content understanding system 102 can update the digital content understanding graphical user interface 304 upon initiation of this process to include the title of the video clip classifier model being generated (e.g., "Happy Shots") and a display including tabs 312*a* (e.g., "Choose Candidates"), 310*b* (e.g., "Confirm Choices"), 310*c* (e.g., "Build and Improve"), and 310*d* (e.g., "Use/Publish"). In one or more implementations, the digital content understanding system 102 can guide the user of the client computing device 106 in the process of generating the new video clip classifier model based on the functionality present under each of the tabs 310*a*-310*d*.

In response to a detected selection of the tab 310*a* (e.g., "Choose Candidates"), the digital content understanding system 102 can update the digital content understanding graphical user interface 304 to include a search query input field 312 and a "Search" button 314. As further shown in FIG. 3C, the digital content understanding system 102 can detect a search input within the search query input field 312 (e.g., "laughing") and a selection of the "Search" button 314. In response to this, the digital content understanding system 102 can identify one or more training digital video clips, as shown in FIG. 3D. For example, the training digital video clip display 316*a* can include a training digital video clip 318*a* loaded into video playback window, a title ID 320*a*, a digital video clip title 322*a*, a starting timestamp 324*a*, a duration 326*a*, a classification score 328*a*, and a label option 330*a*.

In more detail, the digital content understanding system 102 can identify the training digital video clip 318*a* by performing a search of the digital content repository 110. For example, the digital content repository 110 can store training digital video clips that include a number of digital video frames and metadata including the title ID and title for the digital video from which the clip came, the timestamp where the clip starts within the digital video, and the duration of the clip within the digital video. As such, the digital content understanding system 102 can identify the training digital video clip 318*a* by performing a visual search of the training digital video clip frames stored in the digital content repository 110 for those that respond to the search query in the search query input field 312. For example, the digital content understanding system 102 can utilize computer vision techniques to analyze training digital video clips frames in the digital content repository 110 for those that depict the object, character, or topic of the search query. In some implementations, the digital content understanding system 102 can further identify the training digital video clip 318*a* by searching through the metadata associated with the training digital video clips in the digital content repository 110 for terms and other data that corresponds with the search query.

In one or more implementations, the digital content understanding system 102 can generate the display of the training digital video clip display 316*a* shown in FIG. 3D such that the user of the client computing device 106 can watch the training digital video clip 318*a* via a video playback control within the training digital video clip display 316*a* and determine whether the training digital video clip 318*a* should be used to train the new video clip classifier model. For example, the digital content understanding system 102 can add the training digital video clip 318*a* to a corpus of training digital video clips for training the new video clip classifier model in response to detecting a selection of a positive radio button 331*b* in the label option 330*a*. Conversely, the digital content understanding system 102 can keep the training digital video clip 318*a* out of the corpus of training digital video clips in response to no selection being made in the label option 330*a*.

In at least one implementation, the digital content understanding system 102 can identify training digital video clips that positively respond to the desired depiction indicated by the title of the new video clip classifier model (e.g., a received search query). For example, as shown in FIG. 3D, the digital content understanding system 102 identified the training digital video clip 318*a* that depicts at least one person smiling. In an additional implementation, the digital content understanding system 102 can further identify training digital video clips that negatively respond to the desired depiction indicated by the title of the new video clip classifier model. For example, as shown in FIG. 3E, the digital content understanding system 102 can generate the training digital video clip display 316*b* and add the training digital video clip 318*b* to the same corpus of training digital video clips, even though the training digital video clip 318*b* responds negatively to the video clip classifier title "Happy Shots"-in other words the training digital video clip 318*b* responds to the search query "sad" which is an antonym of "laughing" and/or "happy." The digital content understanding system 102 can determine, for example, that the training digital video clip 318*b* is a negative training digital video clip that corresponds to the video clip classifier model "Happy Shots" in response to a detected selection of the negative radio button 331*a* in the label option 330*b*.

In one or more implementations, the digital content understanding system 102 can build the corpus of training digital video clips over multiple iterations. For example, a user of the client computing device 106 can add multiple terms to the search query input field 312 over multiple iterations. Each of the terms input by the user can be associated—either positively or negatively—to the desired depiction indicated by the title of the new video clip classifier model "Happy Shots." To illustrate, the digital content understanding system 102 can search for training digital video clips that respond to positive associated terms like "smiling," "laughing," "sunny," "singing," and "hugging." The digital content understanding system 102 can further search for training digital video clips that respond to negatively associated terms like "sad," "angry," "dark," and "fighting." In some implementations, these terms are input by the user of the client computing device 106. In additional implementations, the digital content understanding system 102 can identify, suggest, and/or input the same terms.

Once the digital content understanding system 102 has constructed the corpus of training digital video clips—of both positive training digital video clips and negative training digital video clips—the digital content understanding system 102 can provide the user of the client computing device 106 with an opportunity to fine-tune the corpus of training digital video clips. For example, as shown in FIG. 3F, in response to a detected selection of the tab 310*b*, the digital content understanding system 102 can update the digital content understanding graphical user interface 304 to include the corpus 333 of training digital video clip displays 316*a*, 316*c* (e.g., such as the training digital video clip 318*a* and the training digital video clip 318*c*). From this display, the digital content understanding system 102 enables the user of the client computing device 106 to verify the positive and negative labels indicated by the label options 330*a*, 330*b* associated with each of the training digital video clips 318*a*, 318*c*, respectively.

With the corpus of training digital video clips generated and verified, the digital content understanding system 102 can build the new video clip classifier model (e.g., the video clip classifier model "Happy Shots"). For example, as shown in FIG. 3G and in response to a detected selection of the tab 310*c*, the digital content understanding system 102 can generate and provide the "Build" button 336 within the digital content understanding graphical user interface 304. In response to a detected selection of the "Build" button 336, the digital content understanding system 102 can generate and begin training the new video clip classifier model.

For example, as shown in FIG. 3H, the digital content understanding system 102 can build the new video clip classifier model, and then apply the video clip classifier model to the corpus of training digital video clips. As a result, the video clip classifier model generates classification category predictions for each of the training digital video clips within various levels of confidence. To illustrate, FIG. 3H shows the classification category prediction display area 342 including classification category prediction displays—including a classification category prediction display 344*a*—sorted under positive levels of confidence and negative levels of confidence. For example, the various levels of confidence include a high level of positive confidence 338*a* and a low level of positive confidence 338*b*, and a high level of negative confidence 340*a* and a low level of negative confidence 340*b*.

In one or more implementations, the digital content understanding system 102 sorts classification category predictions under the high level of positive confidence 338*a* in response to the video clip classifier model generating prediction scores for those classification category predictions that are higher than a threshold amount. For example, as shown in FIG. 3I, the digital content understanding system 102 sorts the classification category prediction displays 344*b*, 344*a*, and 344*c* under the high level of positive confidence 338*a* in response to the classification scores 328*b*, 328*a*, and 328*c* associated with those classification category predictions being higher than a predetermined threshold. In at least one implementation, the classification scores 328*b*, 328*a*, and 328*c* indicate how likely the training digital video clip associated classification category prediction includes the desired depiction indicated by the title of the video clip classifier model (e.g., "Happy Shots"). In other words, how likely the training digital video clip depicts the concept both positively and negatively indicated by the corpus of training digital video clips. In at least one implementation, as further shown in FIG. 3I, the digital content understanding system 102 can display the classification category prediction displays 344*a*-344*c* within the classification category prediction display area 342 in ranked order based on their classification scores 328*a*-328*c*.

As mentioned above, the digital content understanding system 102 also sorts the negative classification category predictions into levels of confidence (i.e., levels of confidence as to whether the training digital video clips in the training corpus do not include a desired depiction associated with the title of the video clip classifier model). For example, as shown in FIG. 3J and in response to a detected selection of the high level of negative confidence 340*a*, the digital content understanding system 102 can update the classification category prediction display area 342 with the classification category prediction displays 346*a*, 346*b*, and 346*c*. As indicated by the classification scores 328*a*-328*c*, the classification category predictions under the high level of negative confidence 340*a* are associated with video clips that the video clip classifier model is very confidence do not portray concept or theme indicated by the title of the video clip classifier model (e.g., "Happy Shots").

Additionally, as shown in FIG. 3K and in response to a detected selection of the low level of positive confidence 338*b*, the digital content understanding system 102 can update the classification category prediction display area 342 with classification category predictions with mid-range or borderline classification scores 328*a*, 328*b*. For example, the digital video clips associated with the classification category prediction displays 348*a* and 348*b* may not clearly or explicitly depict the concept or theme indicated by the title of the video clip classifier model. To illustrate, a digital video clip may portray a character smiling but in a scene with a negative context. As such, the video clip classifier model may generate prediction scores for such digital video clips that are not strongly positive or strongly negative. For such classification category prediction displays 348*a*-348*b*, the digital content understanding system 102 can receive additional accuracy acknowledgements via the label option 330*a*, 330*b*. For example, the user of the client computing device 106 can indicate that the classification category prediction display 348*a* is positively associated with the concept "Happy Shots" by selecting the positive radio button 331*b*.

Similarly, as shown in FIG. 3L and in response to a detected selection of the low level of negative confidence 340*b*, the digital content understanding system 102 can update the classification category prediction display area 342 with a classification category prediction display 350*a* with a mid-range classification score relative to negative concepts related to the concept or theme indicated by the title of the video clip classifier model. As with the low level of positive confidence 338*b*, classification category prediction display 350*a* under the low level of negative confidence 340*b* may be associated with a digital video clip that may or may not portray a negative concept that corresponds to "Happy Shots." The digital content understanding system 102 can explicitly label the classification category prediction display 350*a* in response to detected selections via the label option 330*a*.

In one or more implementations, the digital content understanding system 102 can re-train the video clip classifier model based on user acknowledgements detected via the label options 331*a*, 331*b* under the high level of positive confidence 338*a*, the low level of positive confidence 338*b*, the high level of negative confidence 340*a*, and the low level of negative confidence 340*b*. For example, the digital content understanding system 102 can re-label digital video clips within the corpus of training digital video clips to reflect the user acknowledgements. The digital content understanding system 102 can further re-train the video clip classifier model with the updated corpus.

Additionally, the digital content understanding system 102 can re-apply the video clip classifier model through additional training cycles. For example, the digital content understanding system 102 can apply the video clip classifier model to the corpus of training digital video clips again even after all training digital video clips have been labeled. In each additional training cycle, the user may re-label divergent predictions generated by the video clip classifier model. In some implementations, divergent predictions generated by the video clip classifier model may signal a need for additional training digital video clips to be added to the training corpus such that the video clip classifier model can better "learn" a specific concept.

With the video clip classifier model trained, the digital content understanding system 102 can apply the video clip classifier model to digital video clips that are not part of the corpus of training digital video clips. For example, as shown in FIG. 3M and in response to a detected selection of the tab 310*d*, the digital content understanding system 102 can configure the application of the video clip classifier model. For example, the digital content understanding system 102 can update the digital content understanding graphical user interface 304 to include options 352*a*, 352*b*, 352*c*, and 352*d*. For example, in response to a detected selection of the option 352*b*, 352*c*, or 352*d*, the digital content understanding system 102 can publish the video clip classifier model to various outlets.

In response to a detected selection of the option 352*a*, the digital content understanding system 102 can provide the title input 354, the number of shots input 356, and the ordering input 358. For example, the digital content understanding system 102 can identify a short-form digital video (e.g., a TV episode), a long-form digital video (e.g., a movie), or a season of short-form digital videos according to detected user input via the title input 354. In one or more implementations, the digital content understanding system 102 can identify the digital video indicated by the title input 354 based on a numeric identifier, a title, a genre, and/or a keyword.

Following identification of the digital video indicated by the title input 354, the digital content understanding system 102 can parse the digital video into digital video clips. For example, as the video clip classifier model may be trained to operate in connection with video clips rather than full digital videos, the digital content understanding system 102 can parse the digital video into clips by identifying portions of continuous digital video footage between two cuts within the full digital video. To illustrate, the digital content understanding system 102 can identify transitions between two shots or scenes as cuts and can parse the digital video based on the identified transitions. As such, the parsed video clips may be of different lengths and may include different depictions.

The digital content understanding system 102 can further apply the video clip classifier model to the parsed digital video clips to generate video clip classification scores. As discussed above, each digital video clip's classification score can predict the likelihood of that clip including the desired depiction (e.g., the desired object, desired subject, desired character, desired emotion, etc.) that the video clip classifier model was trained to identify. In the example shown throughout FIGS. 3A-3N, the video clip classifier model can generate scores for digital video clips predicting whether each of the digital video clips depict a "Happy Shot."

In one or more implementations, the digital content understanding system 102 can present the results of the video clip classifier model according to the shots input 356 and the ordering input 358. For example, the digital content understanding system 102 can generate a display of the digital video clips parsed from the digital video (e.g., "81031991—The Witcher: Season 2") that includes the top 10 highest scoring digital video clips in ranked order (e.g., highest score to lowest score). In at least one implementation, the digital content understanding system 102 can parse the digital video, apply the video clip classifier model, and generate the results display in response to a detected selection of the "Get Shots" button 360.

To illustrate, as shown in FIG. 3N, the digital content understanding system 102 can generate the results display 361 including the suggested digital video clip displays 362*a* and 362*b*. As shown, the digital content understanding system 102 can rank the suggested digital video clip displays 362*a*, 362*b* according to their classification scores 328*a*, 328*b* (e.g., as dictated by the ordering input 358).

As mentioned above, and as shown in FIG. 4, the digital content understanding system 102 performs various functions in connection with automatically identifying digital video clips for inclusion in media assets such as trailers and previews. FIG. 4 is a block diagram 400 of the digital content understanding system 102 operating within the memory 114 of the server(s) 104 while performing these functions. As such, FIG. 4 provides additional detail with regard to these functions. For example, as shown in FIG. 4, the digital content understanding system 102 can include a digital video parsing manager 402, a video clip classifier model manager 404, and a graphical user interface manager 406.

In certain implementations, the digital content understanding system 102 may represent one or more software applications, modules, or programs that, when executed by a computing device, may cause the computing device to perform one or more tasks. For example, and as will be described in greater detail below, one or more of the digital video parsing manager 402, the video clip classifier model manager 404, or the graphical user interface manager 406 may represent software stored and configured to run on one or more computing devices, such as the server(s) 104. One or more of the digital video parsing manager 402, the video clip classifier model manager 404, and the graphical user interface manager 406 of the digital content understanding system 102 shown in FIG. 4 may also represent all or portions of one or more special purpose computers to perform one or more tasks.

As mentioned above, and as shown in FIG. 4, the digital content understanding system 102 can include the digital video parsing manager 402. In one or more implementations, the digital video parsing manager 402 handles tasks associated with separating a digital video into clips. For example, the digital video parsing manager 402 can identify cuts or scene transitions within the digital video. In at least one implementation, the digital video parsing manager 402 can further generate digital video clips including the film footage between the identified cuts or transitions. In some implementations, the digital video parsing manager 402 adds metadata to the digital video clips that can include the title of digital video from which the clips were parsed, timestamps where the clips begin in their associated digital videos, a duration of the digital video clips, and so forth.

As mentioned above, and as shown in FIG. 4, the digital content understanding system 102 can include the video clip classifier model manager 404. In one or more implementations, the video clip classifier model manager 404 handles tasks associated with generating, training, and applying a video clip classifier model. For example, the video clip classifier model manager 404 can generate a video clip classifier model including a binary classifier machine learning model. The video clip classifier model manager 404 can further train the video clip classifier model based on a corpus of training digital video clips to make binary predictions. Once the video clip classifier model is trained, the video clip classifier model manager 404 can apply the video clip classifier model to digital video clips that are not part of the training corpus.

While the examples and implementations discussed herein include video clip classifier models, in other implementations, the digital content understanding system 102 can generate, train, and apply other types of classifier models. For example, the digital content understanding system 102 can generate and train audio clip classifier models, and/or script text classifier models. Similarly, while the implementations discussed herein function in connection with digital video clips, other implementations may function in connection with short-form digital videos and/or other longer digital video segments. Additionally, in other implementations, the video clip classifier model manager 404 can generate a video clip classifier model including a machine learning model that is different and/or more sophisticated than a binary classifier machine learning model.

Additionally, the examples discussed herein focus on video clip identification for generation of video assets such as previews and trailers. In additional implementations, the video clip classifier model manager 404 generates and trains video clip classifier models for identifying clips within a digital video that include undesirable content (e.g., profanity, nudity, violence). Based on these clip identifications, other systems may give ratings to digital videos, issue parental warnings associated with digital videos, filter digital videos, etc.

Additionally, in one or more implementations, the video clip classifier model manager 404 can train and re-train a video clip classifier model non-linearly and over multiple iterations. Put another way, the video clip classifier model manager 404 may not generate and train the video clip classifier model in a specific sequence relative to creation of the training corpus and application of the video clip classifier model to non-training digital video clips. To illustrate, the video clip classifier model manager 404 enables training and re-training at any point in the process depicted through FIGS. 3A-3N. For example, the video clip classifier model manager 404 can retrain a video clip classifier even after it has been published to one or more outlets and/or applied to new non-training digital video clips to generate classification predictions. As such, the video clip classifier model manager 404 encourages continued retraining of a video clip classifier model to improve the efficiency and accuracy of that model.

In one or more implementations, the video clip classifier model manager 404 can further handle tasks associated with generating a corpus of training digital video clips. For example, the video clip classifier model manager 404 can search the repository 110 based on search queries, receive user acknowledgements associated with training digital video clips, and generate a corpus of training digital video clips based on the user acknowledgements. In at least one implementation, the video clip classifier model manager 404 can allow for modifications to a corpus of training digital video clips at any point during the process illustrated throughout FIGS. 3A-3N.

As mentioned above, and as shown in FIG. 4, the digital content understanding system 102 can include the graphical user interface manager 406. In one or more implementations, the graphical user interface manager 406 generates and updates the digital content understanding graphical user interface 304. For example, the graphical user interface manager 406 can include or be associated with a webserver that generates web browser instructions that cause the web browser 108 to render the digital content understanding graphical user interface 304 on the client computing device 106. The graphical user interface manager 406 can further update the digital content understanding graphical user interface 304 based on outputs of the digital video parsing manager 402 or the video clip classifier model manager 404. The graphical user interface manager 406 can further update the digital content understanding graphical user interface 304 based on detected user interactions in connection with the web browser 108 on the client computing device 106.

As shown in FIGS. 1 and 4, the digital content understanding system 102 and the client computing device 106 can include one or more physical processors, such as the physical processor 118. The physical processor 118 can generally represent any type or form of hardware-implemented processing unit capable of interpreting and/or executing computer-readable instructions. In one implementation, the physical processor 118 may access and/or modify one or more of the components of the digital content understanding system 102. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Additionally, the server(s) 104 and the client computing device 106 can include the memory 114. In one or more implementations, the memory 114 generally represents any type or form of volatile or non-volatile storage device or medium capable of storing data and/or computer-readable instructions. In one example, the memory 114 may store, load, and/or maintain one or more of the components of the digital content understanding system 102. Examples of the memory 114 can include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Moreover, as shown in FIG. 4, the server(s) 104 and the client computing device 106 can include the additional items 116. On the server(s) 104, the additional items 116 can include the digital content repository 110. As mentioned above, the digital content repository 110 can include training digital video clips, corpora of training digital video clips, and other digital videos. In some implementations, the digital content repository 110 can also include other types of digital content such as dialog audio, score audio, digital script text, and still images.

In summary, the digital content understanding system 102 enables the accurate and efficient generation of video clip-based assets such as trailers and previews. For example, the digital content understanding system 102 generates robust corpora of training digital video clips associated with desired depictions that can include abstract and/or subjective ideas. As discussed above, the digital content understanding system 102 creates greater efficiency in the training and use of video clip classifier models by labeling both high confidence training data—that includes video clips that are both positively responsive to the desired depiction and negatively responsive to the desired depiction—and low confidence training data. The digital content understanding system 102 further trains video clip classifier models using these generated training digital video clips. Finally, the digital content understanding system 102 can apply trained video clips classifier models to new digital video clips and publish the trained video clips classifier models for use via additional outlets. In one or more implementations, as discussed herein, the digital content understanding system 102 facilitates the process of generating, training, and applying video clip classifier models by generating and updating a digital content understanding graphical user interface.

EXAMPLE EMBODIMENTS

Example 1: A computer-implemented method for generating classification category predictions for digital video clips of whether the digital video clips depict a specified object, subject, shot type, emotion, and so forth. For example, the method may include generating, by applying a video clip classifier model to a corpus of training digital video clips that respond to a received search input and within a digital content understanding graphical user interface, classification category prediction displays for the corpus of training digital video clips, re-training the video clip classifier model based on user acknowledgements, detected via the digital content understanding graphical user interface, as to accuracies of the classification scores generated by the video clip classifier model that correspond to the training digital video clips, parsing a digital video into digital video clips in response to detecting a selection of the digital video via the digital content understanding graphical user interface, and generating suggested digital video clip displays that replace the classification category prediction displays within the digital content understanding graphical user interface based on applying the re-trained video clip classifier model to the digital video clips.

Example 2: The computer-implemented method of Example 1, further including generating the corpus of training digital video clips by iteratively receiving the search input related to at least one of an object, an action, a shot type, an editing technique, a character, or a story theme, and receiving the search input related to at least one of an object, an action, a shot type, an editing technique, a character, or a story theme; and identifying, within a repository of training digital video clips, a plurality of training digital video clips that respond to the received search input.

Example 3: The computer-implemented method of any of Examples 1 and 2, wherein the classification category prediction displays within the digital content understanding graphical user interface comprises a playback window loaded with a training digital video clip corresponding to the classification category prediction display, a title of a digital video from which the training digital video clip corresponding to the classification category prediction display came, and an option to positively acknowledge or negatively acknowledge the training digital video clip corresponding to the classification category prediction display.

Example 4: The computer-implemented method of any of Examples 1-3, wherein generating the classification category prediction displays within the digital content understanding graphical user interface further includes sorting the classification category prediction displays into high levels of confidence and low levels of confidence and updating the classification category prediction displays within the digital content understanding graphical user interface according to the high levels of confidence and the low levels of confidence.

Example 5: The computer-implemented method of any of Examples 1-4, further including detecting the user acknowledgements as to the accuracies of the classification scores generated by the video clip classifier model by detecting at least one of a first user input corresponding to a positive acknowledgement of a first video clip included in the training digital video clips, or a second user input corresponding to a negative acknowledgement of the first video clip included in the training digital video clips.

Example 6: The computer-implemented method of any of Examples 1-5, further including detecting the selection of the digital video via the digital content understanding graphical user interface by detecting a selection of at least one of a short-form digital video, a long-form digital video, or a season of short-form digital videos.

Example 7: The computer-implemented method of any of Examples 1-6, wherein parsing the digital video into digital video clips includes parsing the digital video into portions of continuous digital video footage between two cuts.

Example 8: The computer-implemented method of any of Examples 1-7, wherein generating the suggested digital video clip displays that replace the classification category prediction displays within the digital content understanding graphical user interface includes generating input vectors based on the digital video clips, applying the re-trained video clip classifier model to the generated input vectors, receiving, from the re-trained video clip classifier model, classification scores for the digital video clips that correspond to the received search input, generating, for the digital video clips, suggested digital video clip displays, and replacing the classification category prediction displays with the suggested digital video clip displays for the digital video clips within the digital content understanding graphical user interface according to the classification scores for the digital video clips.

In some examples, a system may include at least one processor and a physical memory including computer-executable instructions that, when executed by the at least one processor, cause the at least one processor to perform various acts. For example, the computer-executable instructions may cause the at least one processor to perform acts including generating, by applying a video clip classifier model to a corpus of training digital video clips that respond to a received search input associated with a desired depiction and within a digital content understanding graphical user interface, classification category prediction displays for the corpus of training digital video clips, re-training the video clip classifier model based on user acknowledgements, detected via the digital content understanding graphical user interface, as to accuracies of classification scores generated by the video clip classifier model that correspond to the training digital video clips, parsing a digital video into digital video clips in response to detecting a selection of the digital video via the digital content understanding graphical user interface, and generating suggested digital video clip display that replace the classification category prediction displays within the digital content understanding graphical user interface based on applying the re-trained video clip classifier model to the digital video clips.

Additionally in some examples, a non-transitory computer-readable medium can include one or more computer-executable instructions that, when executed by at least one processor of a computing device, cause the computing device to perform various acts. For example, the one or more computer-executable instructions may cause the computing device to generate, by applying a video clip classifier model to a corpus of training digital video clips that respond to a received search input associated with a desired depiction and within a digital content understanding graphical user interface, classification category prediction displays for the corpus of training digital video clips, re-train the video clip classifier model based on user acknowledgements, detected via the digital content understanding graphical user interface, as to accuracies of classification scores generated by the video clip classifier model corresponding to the training digital video clips, parse a digital video into digital video clips in response to detecting a selection of the digital video via the digital content understanding graphical user interface, and generate suggested digital video clip displays that replace the classification category prediction displays within the digital content understanding graphical user interface based on applying the re-trained video clip classifier model to the digital video clips.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of," Finally, for ease of use, the terms "including" and "having" (and their derivatives), as used in the specification and claims, are interchangeable with and have the same meaning as the word "comprising."

What is claimed is:

1. A computer-implemented method comprising:

generating, by applying a video clip classifier model to a corpus of training digital video clips that respond to one or more search inputs that positively or negatively inform a desired depiction, classification category prediction displays for the corpus of training digital video clips, wherein:

the classification category prediction displays for the corpus of training digital video clips are generated within a digital content understanding graphical user interface, and the desired depiction is different from the one or more search inputs;

re-training the video clip classifier model based on user acknowledgements, detected via the digital content understanding graphical user interface, as to accuracies of classification scores generated by the video clip classifier model that correspond to the training digital video clips;

parsing a digital video, distinct from the corpus of training digital video clips, into digital video clips in response to detecting a selection of the digital video via the digital content understanding graphical user interface; and generating suggested digital video clip displays for the digital video clips parsed from the digital video that replace the classification category prediction displays within the digital content understanding graphical user interface based on applying the re-trained video clip classifier model to the digital video clips.

2. The computer-implemented method of claim 1, further comprising generating the corpus of training digital video clips by iteratively:

receiving the search input related to at least one of an object, an action, a shot type, an editing technique, a character, or a story theme; and identifying, within a repository of training digital video clips, a plurality of training digital video clips that respond to the received search input.

3. The computer-implemented method of claim 1, wherein the classification category prediction displays within the digital content understanding graphical user interface comprise a playback window loaded with a training digital video clip corresponding to the classification category prediction display, a title of a digital video from which the training digital video clip corresponding to the classification category prediction display came, and an option to positively acknowledge or negatively acknowledge the training digital video clip corresponding to the classification category prediction display.

4. The computer-implemented method of claim 3, wherein generating the classification category prediction displays within the digital content understanding graphical user interface further comprises:

sorting the classification category prediction displays into high levels of confidence and low levels of confidence; and updating the classification category prediction displays within the digital content understanding graphical user interface according to the high levels of confidence and the low levels of confidence.

5. The computer-implemented method of claim 3, further comprising detecting the user acknowledgements as to the accuracies of the classification scores generated by the video clip classifier model by detecting at least one of:

a first user input corresponding to a positive acknowledgement of a first video clip included in the training digital video clips; or a second user input corresponding to a negative acknowledgement of the first video clip included in the training digital video clips.

6. The computer-implemented method of claim 1, further comprising detecting the selection of the digital video via the digital content understanding graphical user interface by detecting a selection of at least one of a short-form digital video, a long-form digital video, or a season of short-form digital videos.

7. The computer-implemented method of claim 1, wherein parsing the digital video into digital video clips comprises parsing the digital video into portions of continuous digital video footage between two cuts.

8. The computer-implemented method of claim 1, wherein generating the suggested digital video clip displays that replace the classification category prediction displays within the digital content understanding graphical user interface comprises:

generating input vectors based on the digital video clips;

applying the re-trained video clip classifier model to the generated input vectors;

receiving, from the re-trained video clip classifier model, classification scores for the digital video clips that corresponds to the received search input;

generating, for the digital video clips, suggested video clip displays; and replacing the classification category prediction displays with the suggested digital video clip displays for the digital video clips within the digital content understanding graphical user interface according to the classification scores for the digital video clips.

9. A system comprising:

at least one physical processor; and physical memory comprising computer-executable instructions that, when executed by the at least one physical processor, cause the at least one physical processor to perform acts comprising:

generating, by applying a video clip classifier model to a corpus of training digital video clips that respond to one or more search inputs that positively or negatively inform a desired depiction, classification category prediction displays for the corpus of training digital video clips, wherein:

the classification category prediction displays for the corpus of training digital video clips are generated within a digital content understanding graphical user interface, and the desired depiction is different from the one or more search inputs;

re-training the video clip classifier model based on user acknowledgements, detected via the digital content understanding graphical user interface, as to accuracies of classification scores generated by the video clip classifier model that correspond to the training digital video clips;

parsing a digital video, distinct from the corpus of training digital video clips, into digital video clips in response to detecting a selection of the digital video via the digital content understanding graphical user interface; and generating suggested digital video clip displays for the digital video clips parsed from the digital video that replace the classification category prediction displays within the digital content understanding graphical user interface based on applying the re-trained video clip classifier model to the digital video clips.

10. The system of claim 9, further computer-executable instructions that, when executed by the at least one physical processor, cause the at least one physical processor to generate the corpus of training digital video clips by iteratively:

receiving the search input related to at least one of an object, an action, a shot type, an editing technique, a character, or a story theme; and identifying, within a repository of training digital video clips, a plurality of training digital video clips that respond to the received search input.

11. The system of claim 9, wherein the classification category prediction displays within the digital content understanding graphical user interface comprise a playback window loaded with a training digital video clip corresponding to the classification category prediction display, a title of a digital video from which the training digital video clip corresponding to the classification category prediction display came, and an option to positively acknowledge or negatively acknowledge the training digital video clip corresponding to the classification category prediction display.

12. The system of claim 11, further computer-executable instructions that, when executed by the at least one physical processor, cause the at least one physical processor to generate the classification category prediction displays within the digital content understanding graphical user interface by:

sorting the classification category prediction displays into positive levels of confidence and negative levels of confidence; and updating the classification category prediction displays within the digital content understanding graphical user interface according to the positive levels of confidence and the negative levels of confidence.

13. The system of claim 11, further computer-executable instructions that, when executed by the at least one physical processor, cause the at least one physical processor to detect the user acknowledgements as to the accuracies of the classification scores generated by the video clip classifier model by detecting at least one of:

a first user input corresponding to a positive acknowledgement of a first video clip included in the training digital video clips; or a second user input corresponding to a negative acknowledgement of the first video clip included in the training digital video clips.

14. The system of claim 9, further computer-executable instructions that, when executed by the at least one physical processor, cause the at least one physical processor to detect the selection of the digital video via the digital content understanding graphical user interface by detecting a selection of at least one of a short-form digital video, a long-form digital video, or a season of short-form digital videos.

15. The system of claim 9, further computer-executable instructions that, when executed by the at least one physical processor, cause the at least one physical processor to parse the digital video into digital video clips by parsing the digital video into portions of continuous digital video footage between two cuts.

16. The system of claim 9, further computer-executable instructions that, when executed by the at least one physical processor, cause the at least one physical processor to generate the suggested digital video clip displays that replace the classification category prediction displays within the digital content understanding graphical user interface by:

generating input vectors based on the digital video clips;

applying the re-trained video clip classifier model to the generated input vectors;

receiving, from the re-trained video clip classifier model, classification scores for the digital video clips that correspond to the received search input;

generating, for the digital video clips, suggested digital video clip displays; and replacing the classification category prediction displays with the suggested digital video clip displays for the digital video clips within the digital content understanding graphical user interface according to the classification scores for the digital video clips.

17. A non-transitory computer-readable medium comprising one or more computer-executable instructions that, when executed by at least one processor of a computing device, cause the computing device to:

generate, by applying a video clip classifier model to a corpus of training digital video clips that respond to one or more search inputs that positively or negatively inform a desired depiction, classification category prediction displays for the corpus of training digital video clips, wherein:

the classification category prediction displays for the corpus of training digital video clips are generated within a digital content understanding graphical user interface, and the desired depiction is different from the one or more search inputs;

re-train the video clip classifier model based on user acknowledgements, detected via the digital content understanding graphical user interface, as to accuracies of classification scores generated by the video clip classifier model that correspond to the training digital video clips;

parse a digital video, distinct from the corpus of training digital video clips, into digital video clips in response to detecting a selection of the digital video via the digital content understanding graphical user interface; and generate suggested digital video clip displays for the digital video clips parsed from the digital video that replace the classification category prediction displays within the digital content understanding graphical user interface based on applying the re-trained video clip classifier model to the digital video clips.

18. The non-transitory computer-readable medium of claim 17, comprising one or more computer-executable instructions that, when executed by at least one processor of a computing device, cause the computing device to generate the corpus of training digital video clips by iteratively:

receiving the search input related to at least one of an object, an action, a shot type, an editing technique, a character, or a story theme; and identifying, within a repository of training digital video clips, a plurality of training digital video clips that positively respond to the received search input.

19. The non-transitory computer-readable medium of claim 17, wherein the classification category prediction displays within the digital content understanding graphical user interface comprise a playback window loaded with a training digital video clip corresponding to the classification category prediction display, a title of a digital video from which the training digital video clip corresponding to the classification category prediction display came, and an option to positively acknowledge or negatively acknowledge the training digital video clip corresponding to the classification category prediction display.

20. The non-transitory computer-readable medium of claim 17, comprising one or more computer-executable instructions that, when executed by at least one processor of a computing device, cause the computing device to generate the suggested digital video clip displays that replace the classification category prediction displays within the digital content understanding graphical user interface by:

generating input vectors based on the digital video clips;

applying the re-trained video clip classifier model to the generated input vectors;

receiving, from the re-trained video clip classifier model, classification scores for the digital video clips that correspond to the received search input;

generating, for the digital video clips, suggested digital video clip displays; and replacing the classification category prediction displays with the suggested digital video clip displays for the digital video clips within the digital content understanding graphical user interface according to the classification scores for the digital video clips.

* * * * *